United States Patent
Zhang et al.

(10) Patent No.: US 12,382,540 B2
(45) Date of Patent: Aug. 5, 2025

(54) USER EQUIPMENT AND METHOD PERFORMED BY THE SAME IN WIRELESS COMMUNICATION SYSTEM

(71) Applicant: SAMSUNG ELECTRONICS CO., LTD., Suwon-si (KR)

(72) Inventors: Sa Zhang, Beijing (CN); Min Wu, Beijing (CN); Feifei Sun, Beijing (CN); Yi Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 17/816,943

(22) Filed: Aug. 2, 2022

(65) Prior Publication Data
US 2023/0047579 A1 Feb. 16, 2023

(30) Foreign Application Priority Data

Aug. 3, 2021 (CN) .......................... 202110884954.3
Apr. 29, 2022 (CN) .......................... 202210474348.9

(51) Int. Cl.
*H04W 76/28* (2018.01)
*H04L 1/1812* (2023.01)

(52) U.S. Cl.
CPC ........... *H04W 76/28* (2018.02); *H04L 1/1812* (2013.01)

(58) Field of Classification Search
CPC ........................ H04L 1/1812; H04W 76/28
See application file for complete search history.

(56) References Cited

U.S. PATENT DOCUMENTS

| | | | |
|---|---|---|---|
| 10,542,559 B2 | 1/2020 | Lee et al. | |
| 11,032,831 B2 | 6/2021 | Zhang et al. | |
| 2018/0262937 A1 | 9/2018 | Lee et al. | |
| 2020/0313808 A1* | 10/2020 | Lee | H04L 1/1812 |
| 2020/0322918 A1 | 10/2020 | Shih et al. | |
| 2021/0058945 A1 | 2/2021 | Zhang et al. | |
| 2022/0077960 A1* | 3/2022 | Lee | H04W 72/0446 |
| 2023/0112798 A1* | 4/2023 | Lee | H04W 76/28 |
| | | | 370/329 |

FOREIGN PATENT DOCUMENTS

| | | |
|---|---|---|
| CA | 3129474 A1 | 8/2020 |
| EP | 3716520 A1 | 9/2020 |
| WO | 2019182287 A1 | 9/2019 |

OTHER PUBLICATIONS

International Search Report and Written Opinion of the International Searching Authority dated Nov. 1, 2022, in connection with International Application No. PCT/KR2022/011405, 8 pages.

(Continued)

*Primary Examiner* — Donald L Mills

(57) ABSTRACT

A user equipment (UE) and a method performed by the same in a wireless communication system are provided. The method includes receiving a downlink (DL) signal including a physical downlink control channel (PDCCH) and/or a physical downlink shared channel (PDSCH); and/or transmitting an uplink (UL) signal including a physical uplink control channel (PUCCH) and/or a physical uplink shared channel (PUSCH), where the UE monitors the PDCCH when the UE is in active time of a discontinuous reception (DRX) mode. The method can reduce the power consumption of the UE.

16 Claims, 14 Drawing Sheets

(56) References Cited

OTHER PUBLICATIONS

3GPP TS 38.321 V16.5.0, 3rd Generation Partnership Project; Technical Specification Group Radio Access Network; NR; Medium Access Control (MAC) protocol specification (Release 16); Jun. 2021, 157 pages.
Supplementary European Search Report dated Sep. 26, 2024, in connection with European Patent Application No. 22853430.1, 15 pages.
Supplementary European Search Report dated Dec. 12, 2024, in connection with European Patent Application No. 22853430.1, 15 pages.
Ericsson: "Remaining issues on DRX timers", 3GPP TSG-RAN WG2 #100, R2-1713471, Dec. 2017, 7 pages.
Ericsson: "DRX with Asynchronous HARQ", 3GPP TSG-RAN WG2 #98-AH, R2-1707123, , Resubmission of R2-1704401, Jun. 2017, 4 pages.

* cited by examiner

USER EQUIPMENT AND METHOD PERFORMED BY THE SAME IN WIRELESS COMMUNICATION SYSTEM

CROSS-REFERENCE TO RELATED APPLICATIONS

This application is based on and claims priority under 35 U.S.C. § 119(a) to Chinese Patent Application No. 202110884954.3, filed Aug. 3, 2021, and Chinese Patent Application No. 202210474348.9, filed Apr. 29, 2022, in the China National Intellectual Property Administration, the disclosures of which are herein incorporated by reference in their entirety.

BACKGROUND

1. Field

The present disclosure generally relates to the field of wireless communication, and in particular, to a user equipment and a method performed by the same in a wireless communication system.

2. Description of Related Art $5^{th}$ generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement $6^{th}$ generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IMT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

According to at least one embodiment of the disclosure, a method performed by a user equipment (UE) in a wireless communication system is provided. The method includes: receiving a downlink (DL) signal including a physical downlink control channel (PDCCH) and/or a physical downlink shared channel (PDSCH); and/or transmitting an uplink (UL) signal including a physical uplink control channel (PUCCH) and/or a physical uplink shared channel (PUSCH), where the UE monitors the PDCCH when the UE is in active time of a discontinuous reception. (DRX) mode.

According to some embodiments of the disclosure, a user equipment (UE) in a wireless communication system is also provided. The UE includes a transceiver configured to transmit and receive signals; and a controller coupled to the transceiver and configured to: receive a downlink (DL) signal including a physical downlink control channel (PDCCH) and/or a physical downlink shared channel (PDSCH); and/or transmit an uplink (UL) signal including a physical uplink control channel (PUCCH) and/or a physical uplink shared channel (PUSCH), where the UE monitors the PDCCH when the UE is in active time of a discontinuous reception (DRX) mode.

According to some embodiments of the disclosure, there is also provided a computer-readable storage medium having one or more computer programs stored thereon, wherein the one or more computer programs, when executed by one or more processors, can implement any of the methods described above.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
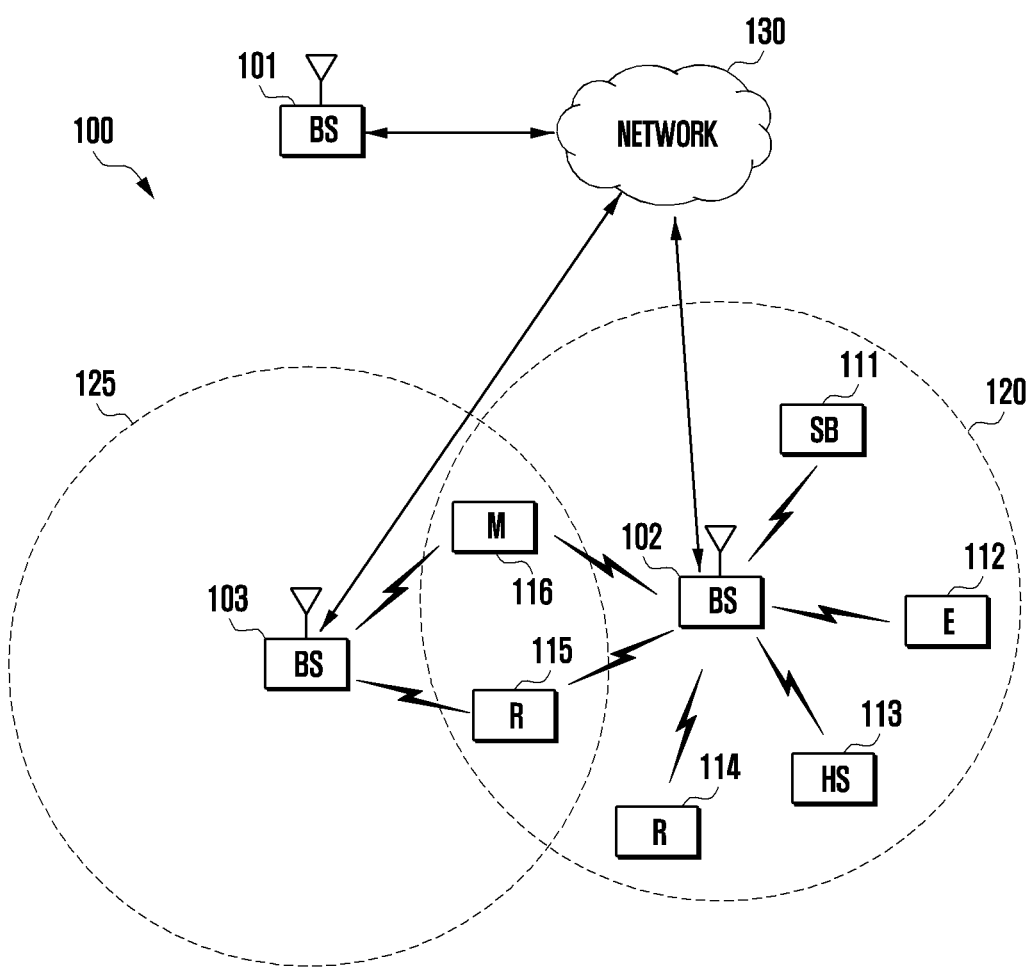
FIG. 1 illustrates a schematic diagram of an example wireless network according to some embodiments of the present disclosure.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Herein, reference to any action or element based on any information, action or element may include an implementation of the action or element based at least in part on any information, action or element. For example, "determine B (B may be any information, action or element) based on A (A may be any information, action or element)" may mean "determine B based at least on A".

The term "include", "comprise", "may include", or "may comprise" refers to the existence of a corresponding disclosed function, operation or component which can be used in various embodiments of the present disclosure and does not limit one or more additional functions, operations, or components. The terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "or" used in various embodiments of the present disclosure includes any or all of combinations of listed items. For example, the expression "A or B" may include A, may include B, or may include both A and B.

It should be understood that "first", "second" and similar words used in the disclosure do not express any order, quantity or importance, but are only used to distinguish different components.

The phrase "at least one of", when used with a list of items, means that different combinations of one or more of the listed items can be used, and only one item in the list may be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A, B and C.

The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" or "processor" means any device, system or part thereof that controls at least one operation. Such a controller or processor can be implemented in hardware or a combination of hardware and software and/or firmware. The functionality associated with any particular controller can be centralized or distributed, whether locally or remotely.

As used herein, any reference to "an example" or "example", "an implementation" or "implementation", "an embodiment" or "embodiment" means that particular elements, features, structures or characteristics described in connection with the embodiment is included in at least one embodiment. The phrases "in one embodiment" or "in one example" appearing in different places in the specification do not necessarily refer to the same embodiment.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as Read-Only Memory (ROM), Random Access Memory (RAM), a hard disk drive, a Compact Disc (CD), a Digital Video Disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

The various embodiments discussed below for describing the principles of the disclosure in the patent document are for illustration only and should not be interpreted as limiting the scope of the disclosure in any way. Those skilled in the art will understand that the principles of the disclosure can be implemented in any suitably arranged wireless communication system. For example, although the following detailed description of the embodiments of the disclosure will be directed to LTE and/or 5G, those skilled in the art will understand that the main points of the disclosure can also be applied to other communication systems with similar technical backgrounds and channel formats with slight modifications without departing from the scope of the disclosure. For example, the technical schemes of the embodiments of the present application can be applied to various communication systems. For example, the communication systems may include global systems for mobile communications (GSM), code division multiple access (CDMA) systems, wideband code division multiple access (WCDMA) systems, general packet radio service (GPRS) systems, long term evolution (LTE) systems, LTE frequency division duplex (FDD) systems, LTE time division duplex (TDD) systems, universal mobile telecommunications system (UMTS), worldwide interoperability for microwave access (WiMAX) communication systems, 5th generation (5G) systems or new radio (NR) systems, etc. In addition, the technical schemes of the embodiments of the present application can be applied to future-oriented communication technologies.

In describing a wireless communication system and in the disclosure described below, higher layer signaling or higher layer signals are signal transferring methods for transferring information from a base station to a terminal over a downlink data channel of a physical layer or from a terminal to a base station over an uplink data channel of a physical layer, and examples of the signal transferring methods may include signal transferring methods for transferring information via Radio Resource Control (RRC) signaling, Packet Data Convergence Protocol (PDCP) signaling, or a Medium Access Control (MAC) Control Element (MAC CE).

Hereinafter, the embodiments of the disclosure will be described in detail with reference to the accompanying drawings. It should be noted that the same reference numerals in different drawings will be used to refer to the same elements already described.

The following FIGS. 1-3B describe various embodiments implemented by using orthogonal frequency division multiplexing (OFDM) or orthogonal frequency division multiple access (OFDMA) communication technologies in wireless communication systems. The descriptions of FIGS. 1-3B do not mean physical or architectural implications for the manner in which different embodiments may be implemented. Different embodiments of the disclosure may be implemented in any suitably arranged communication systems.

FIG. 1 illustrates an example wireless network 100 according to some embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB". For convenience, the terms "gNodeB" and "gNB" are used in this patent document to refer to network infrastructure components that provide wireless access for remote terminals. and, depending on the type of the network, other well-known terms such as "mobile station", "user station", "remote terminal", "wireless terminal" or "user apparatus" can be used instead of "user equipment" or "UE". For example, the terms "terminal", "user equipment" and "UE" may be used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE-A, WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the present disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
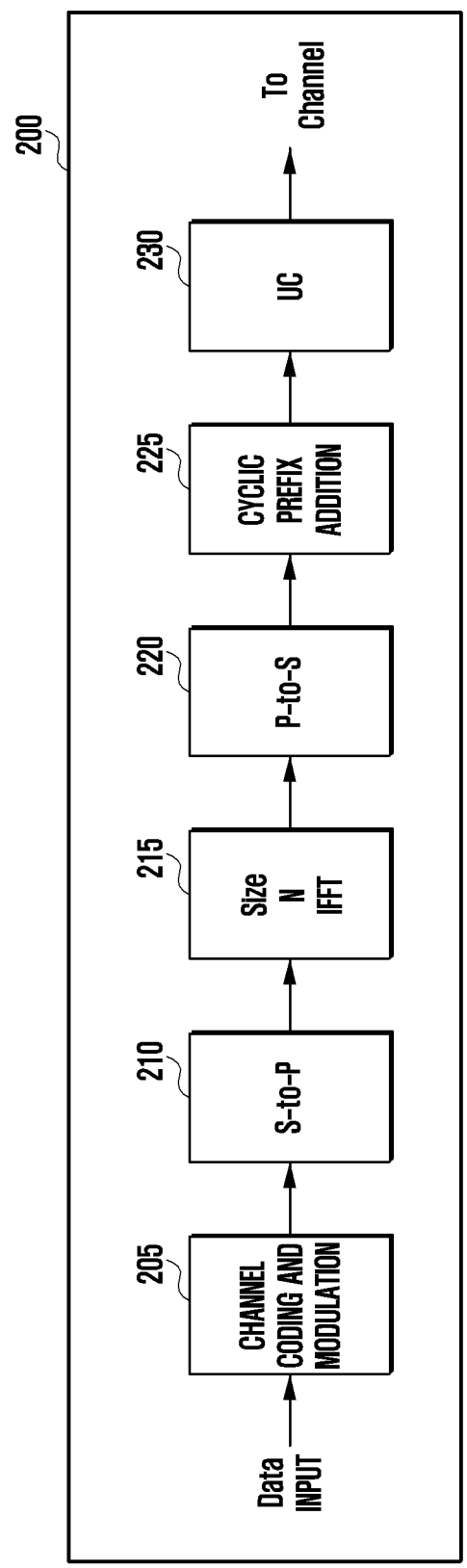
FIG. 2A illustrates an example wireless transmission path according to some embodiments of the present disclosure.
Figure 2B:
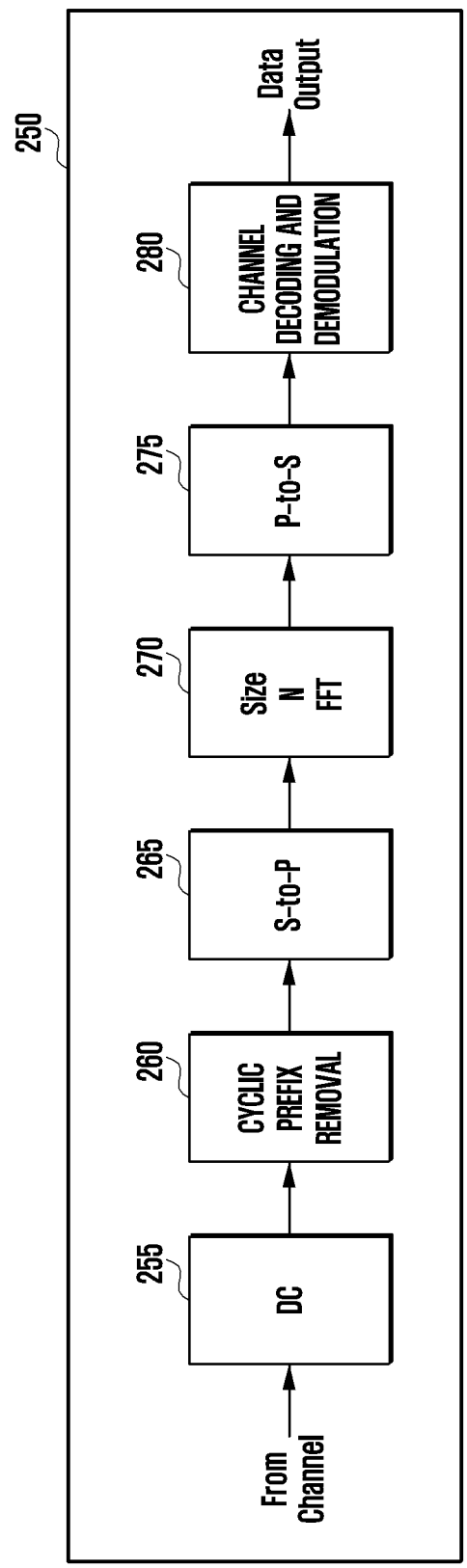
FIG. 2B illustrates an example wireless reception path according to some embodiments of the present disclosure.

FIGS. 2A and 2B illustrate example wireless transmission and reception paths according to some embodiments of the present disclosure. In the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time-domain output signal. The Parallel-to-Serial block 220 converts (such as multiplexes) parallel time-domain output symbols from the Size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time-domain baseband signal. The Serial-to-Parallel block 265 converts the time-domain baseband signal into a parallel time-domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
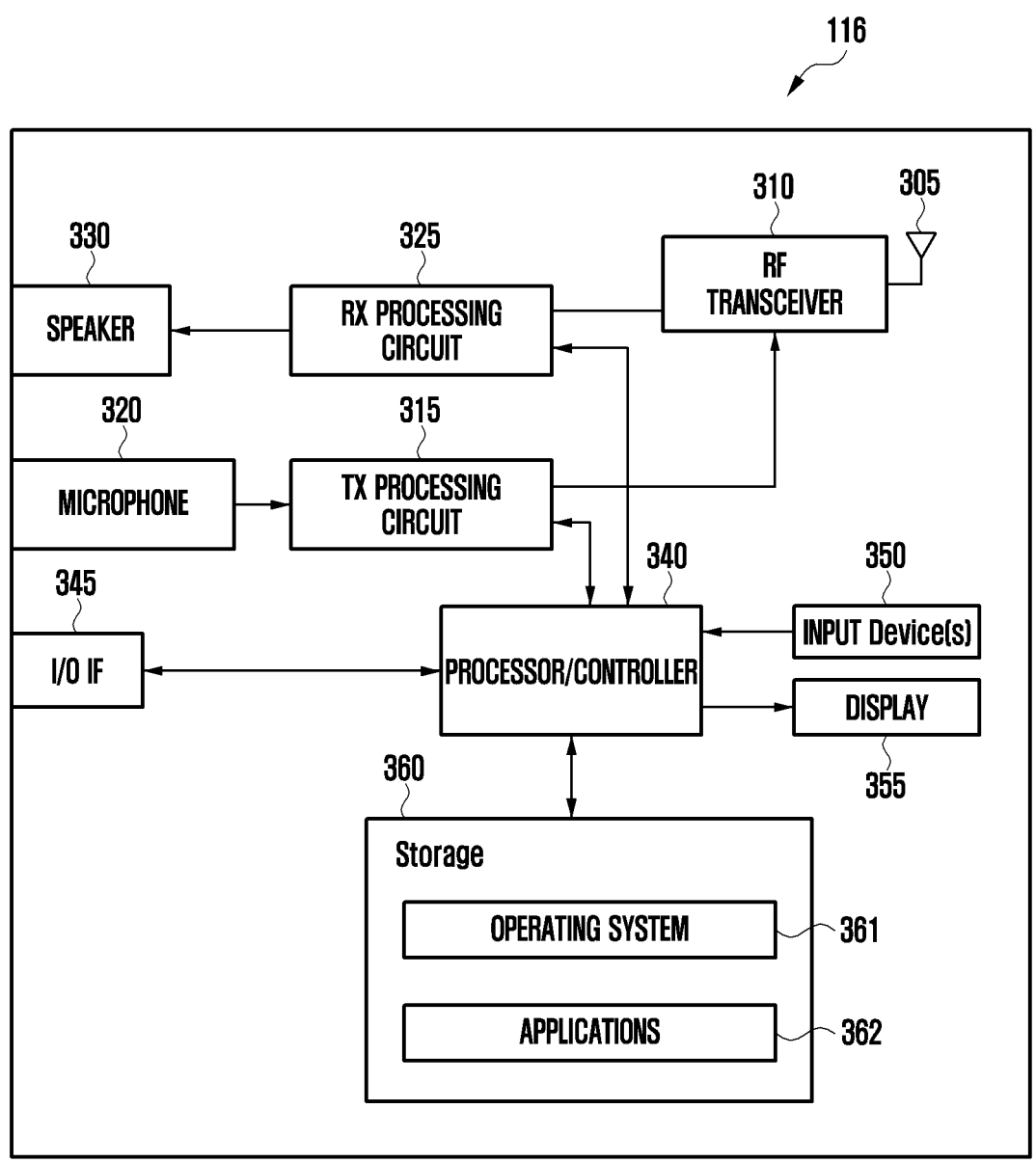
FIG. 3A illustrates an example user equipment (UE) according to some embodiments of the present disclosure.

FIG. 3A illustrates an example UE 116 according to some embodiments of the present disclosure. The embodiment of UE 116 shown in FIG. 3A is for illustration only, and UEs 111-115 of FIG. 1 can have the same or similar configuration. However, a UE has various configurations, and FIG. 3A does not limit the scope of the present disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
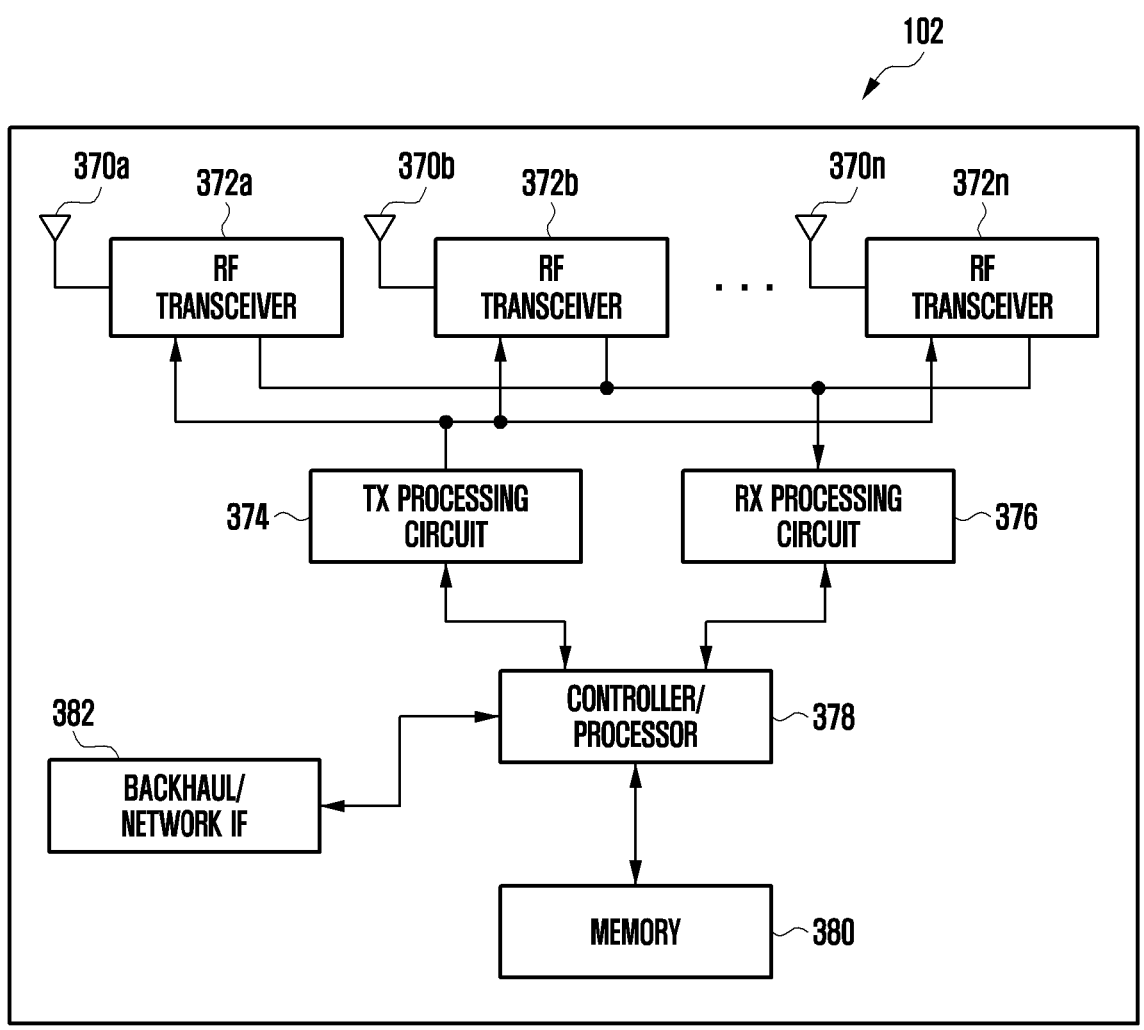
FIG. 3B illustrates an example gNB according to some embodiments of the present disclosure.

FIG. 3B illustrates an example gNB 102 according to some embodiments of the present disclosure. The embodiment of gNB 102 shown in FIG. 3B is for illustration only, and other gNBs of FIG. 1 can have the same or similar configuration. However, a gNB has various configurations, and FIG. 3B does not limit the scope of the present disclosure to any specific implementation of a gNB. It should be noted that gNB 101 and gNB 103 can include the same or similar structures as gNB 102.

As shown in FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include a RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Exemplary embodiments of the disclosure are further described below with reference to the drawings.

With the rapid development of information industry, especially the increasing demand from mobile Internet and internet of things (IoT), it brings unprecedented challenges to the future mobile communication technology. According to the report of International Telecommunication Union (ITU) ITU-R M.[IMT.BEYOND 2020.TRAFFIC], it can be predicted that by 2020, compared with 2010 (4G era), the growth of mobile traffic will be nearly 1000 times, and the number of UE connections will also exceed 17 billion, and the number of connected devices will be even more alarming, with the massive IoT devices gradually infiltrating into the mobile communication network. In order to meet the unprecedented challenges, the communication industry and academia have carried out extensive research on the fifth generation (5G) mobile communication technology to face the 2020s. At present in ITU report ITU-R M. [IMT.VISION], the framework and overall goals of the future 5G has been discussed, in which the demand outlook, application scenarios and important performance indicators of 5G are described in detail. With respect to new requirements in 5G, ITU report ITU-R M.[IMT.FUTURE TECHNOLOGY TRENDS] provides information related to the technology trends of 5G, aiming at solving significant problems such as significantly improved system throughput, consistent user experience, scalability to support IoT, delay, energy efficiency, cost, network flexibility, support of emerging services and flexible spectrum utilization. In 3GPP (3rd Generation Partnership Project), the first stage of 5G is already in progress. To support more flexible scheduling, the 3GPP decides to support variable Hybrid Automatic Repeat request-Acknowledgement (HARQ-ACK) feedback delay in 5G. In existing Long Term Evolution (LTE) systems, a time from reception of downlink data to uplink transmission of HARQ-ACK is fixed. For example, in Frequency Division Duplex (FDD) systems, the delay is 4 subframes. In Time Division Duplex (TDD) systems, a HARQ-ACK feedback delay is determined for a corresponding downlink subframe based on an uplink and downlink configuration. In 5G systems, whether FDD or TDD systems, for a determined downlink time unit (for example, a downlink slot or a downlink mini slot), the uplink time unit that can feedback HARQ-ACK is variable. For example, the delay of HARQ-ACK feedback can be dynamically indicated by physical layer signaling, or different HARQ-ACK delays can be determined based on factors such as different services or user capabilities.

The 3GPP has defined three directions of 5G application scenarios-eMBB (enhanced mobile broadband), mMTC (massive machine-type communication) and URLLC (ultra-reliable and low-latency communication). The eMBB scenario aims to further improve data transmission rate on the basis of the existing mobile broadband service scenario, so as to enhance user experience and pursue ultimate communication experience between people. mMTC and URLLC are the application scenarios for the Internet of Things, but their respective emphases are different: mMTC being mainly information interaction between people and things, while URLLC mainly reflecting communication requirements between things.

In 5G, a UE may support a flexible numerology, larger bandwidth, more flexible scheduling, more terminal antennas, so that the UE implementation complexity and power consumption increase. Some UEs (e.g., wearable devices) have higher requirements for energy saving, and how to reduce the power consumption of the UE is an urgent problem to be solved. For a UE supporting the URLLC service, how to reduce the power consumption of the UE on the premise of ensuring the service reliability is an urgent problem to be solved.

In order to solve at least the above technical problems, the embodiments of the disclosure provide a method performed by a terminal, a terminal, a method performed by a base station and a base station in a wireless communication system, and a non-transitory computer-readable storage medium. Hereinafter, various embodiments of the disclosure will be described in detail with reference to the accompanying drawings.

In embodiments of the disclosure, for the convenience of description, a first type of transceiving node and a second type of transceiving node are defined. For example, the first type of transceiving node may be a base station, and the second type of transceiving node may be a UE. In the following examples, the base station is taken as an example (but not limited thereto) to illustrate the first type of transceiving node, and the UE is taken as an example (but not limited thereto) to illustrate the second type of transceiving node.

Exemplary embodiments of the disclosure are further described below with reference to the drawings.

The text and drawings are provided as examples only to help readers understand the disclosure. They are not intended and should not be interpreted as limiting the scope of the disclosure in any way. Although certain embodiments and examples have been provided, based on the content disclosed herein, it will be apparent to those skilled in the art that changes may be made to the illustrated embodiments and examples without departing from the scope of the disclosure.

Figure 4:
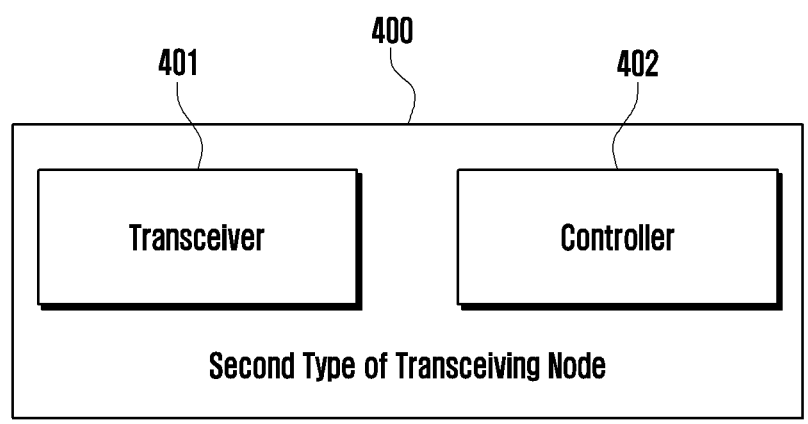
FIG. 4 illustrates a block diagram of a second type of transceiving node according to some embodiments of the present disclosure.

FIG. 4 illustrates a block diagram of the second type of transceiving node according to an embodiment of the disclosure.

Referring to FIG. 4, the second type of transceiving node 400 may include a transceiver 401 and a controller 402.

The transceiver 401 may be configured to receive a first type of data and/or a first type of control signaling from the first type of transceiving node, and transmit a second type of data and/or a second type of control signaling to the first type of transceiving node in a determined time unit.

The controller 402 may be an application specific integrated circuit or at least one processor. The controller 402 may be configured to control the overall operation of the second type of transceiving node and control the second type of transceiving node to implement the methods proposed in embodiments of the disclosure. For example, the controller 402 may be configured to determine the second type of data and/or the second type of control signaling and a time unit for transmitting the second type of data and/or the second type of control signaling based on the first type of data and/or the first type of control signaling, and control the transceiver 401 to transmit the second type of data and/or the second type of control signaling to the first type of transceiving node in the determined time unit.

In some implementations, the controller 402 may be configured to perform one or more of the methods of various embodiments described below. For example, the controller 402 may be configured to perform one or more of operations in a method 500 to be described later in connection with FIG. 5 or a method 800 to be described in connection with FIG. 8 later.

In some implementations, the first type of data may be data transmitted by the first type of transceiving node to the second type of transceiving node. In the following examples, downlink data carried by a PDSCH (Physical Downlink Shared Channel) is taken as an example (but not limited thereto) to illustrate the first type of data.

In some implementations, the second type of data may be data transmitted by the second type of transceiving node to the first type of transceiving node. In the following examples, uplink data carried by a PUSCH (Physical Uplink Shared Channel) is taken as an example to illustrate the second type of data, but not limited thereto.

In some implementations, the first type of control signaling may be control signaling transmitted by the first type of transceiving node to the second type of transceiving node. In the following examples, downlink control signaling is taken as an example (but not limited thereto) to illustrate the first type of control signaling. The downlink control signaling may be DCI (downlink control information) carried by a PDCCH (Physical Downlink Control Channel) and/or control signaling carried by a PDSCH (Physical Downlink Shared Channel). For example, the DCI may be UE specific DCI, and the DCI may also be common DCI. The common DCI may be DCI common to a part of UEs, such as group common DCI, and the common DCI may also be DCI common to all UEs. The DCI may be uplink DCI (e.g., DCI for scheduling the PUSCH) and/or downlink DCI (e.g., DCI for scheduling the PDSCH).

In some implementations, the second type of control signaling may be control signaling transmitted by the second type of transceiving node to the first type of transceiving node. In the following examples, uplink control signaling is taken as an example to illustrate the second type of control signaling, but is not limited thereto. The uplink control signaling may be UCI (Uplink Control Information) carried by a PUCCH (Physical Uplink Control Channel) and/or control signaling carried by a PUSCH (Physical Uplink Shared Channel). A type of UCI may include one or more of: HARQ-ACK information, SR (Scheduling Request), LRR (Link Recovery Request), CSI (Chanel State Information) or CG (Configured Grant) UCI.

In some implementations, a PUCCH carrying SR may be a PUCCH carrying positive SR. The PUCCH carrying SR may be a PUCCH carrying negative SR. The PUCCH carrying SR may be the PUCCH carrying positive SR and/or negative SR.

In some implementations, the CSI may also be Part 1 CSI and/or Part 2 CSI.

In some implementations, a first type of time unit is a time unit in which the first type of transceiving node transmits the first type of data and/or the first type of control signaling. In the following examples, a downlink time unit is taken as an example (but not limited thereto) to illustrate the first type of time unit.

In some implementations, a second type of time unit is a time unit in which the second type of transceiving node transmits the second type of data and/or the second type of control signaling. In the following examples, an uplink time unit is taken as an example to illustrate the second type of time unit, but is not limited thereto.

In some implementations, the first type of time unit and the second type of time unit may be one or more slots, one or more subslots, one or more OFDM (Orthogonal Frequency Division Multiplexing) symbols, or one or more subframes.

Depending on the network type, the term "base station" or "BS" can refer to any component (or a set of components) configured to provide wireless access to a network, such as a Transmission Point (TP), a Transmission and Reception Point (TRP), an evolved base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio (NR) interface/access, Long Term Evolution (LTE), LTE advanced (LTE-A), High Speed Packet Access (HSPA), Wi-Fi 802.11a/b/g/n/ac, etc.

In describing a wireless communication system and in the disclosure described below, higher layer signaling or higher layer signals are signal transferring methods for transferring information from a base station to a terminal over a downlink data channel of a physical layer or from a terminal to a base station over an uplink data channel of a physical layer, and examples of the signal transferring methods may include signal transferring methods for transferring information via Radio Resource Control (RRC) signaling, Packet Data Convergence Protocol (PDCP) signaling, or a Medium Access Control (MAC) Control Element (MAC CE).

Figure 5:
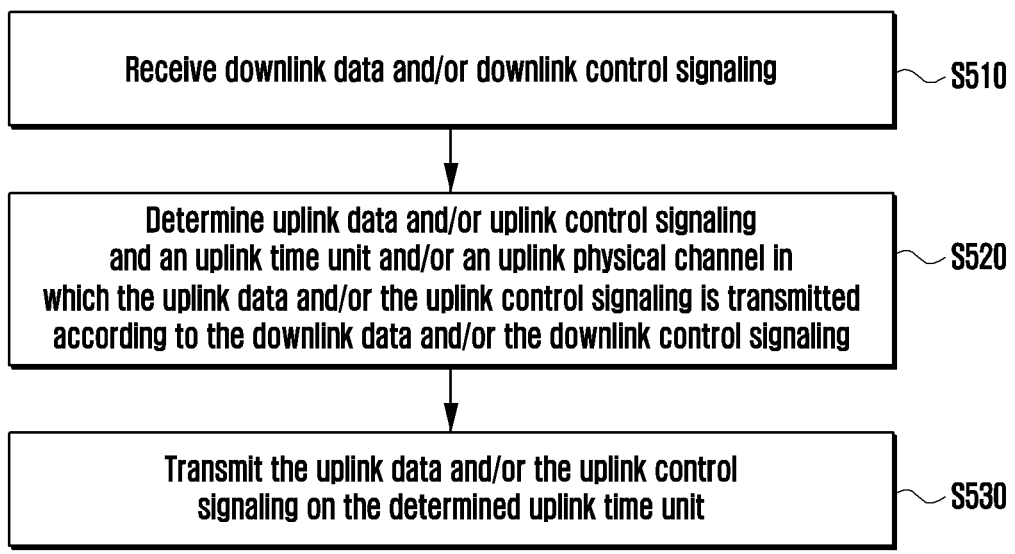
FIG. 5 illustrates a flowchart of a method performed by a UE according to some embodiments of the present disclosure.

FIG. 5 illustrates a flowchart of a method 500 performed by a UE according to embodiments of the disclosure.

Referring to FIG. 5, in step S510, the UE receives downlink data and/or downlink control signaling from a base station. For example, the UE may receive the downlink data and/or the downlink control signaling from the base station based on predefined rules and/or received configuration parameters.

In step S520, uplink data and/or uplink control signaling and an uplink time unit are determined based on the downlink data and/or downlink control signaling.

In step S530, the UE transmits the uplink data and/or the uplink control signaling to the base station in the uplink time unit.

In step S510, the UE may determine a time unit and/or frequency-domain resource in which the downlink data (e.g., PDSCH) and/or the downlink control signaling (e.g., PDCCH) is received according to downlink control signaling (e.g., higher layer signaling) received. For example, parameters of DRX (Discontinuous Reception) may be configured via higher layer signaling, and the UE may determine whether to receive (e.g., monitor) the PDCCH according to the parameter(s) of DRX.

In some implementations, acknowledgement/negative acknowledgement (ACK/NACK) for downlink transmission may be performed by HARQ-ACK.

In some implementations, the downlink control signaling may include DCI carried by a PDCCH and/or control signaling carried by a PDSCH. For example, the DCI may be used to schedule transmission of a PUSCH or reception of the PDSCH. Some examples of uplink transmission timing will be described below with reference to FIGS. 6A-6C.

Figure 6A:
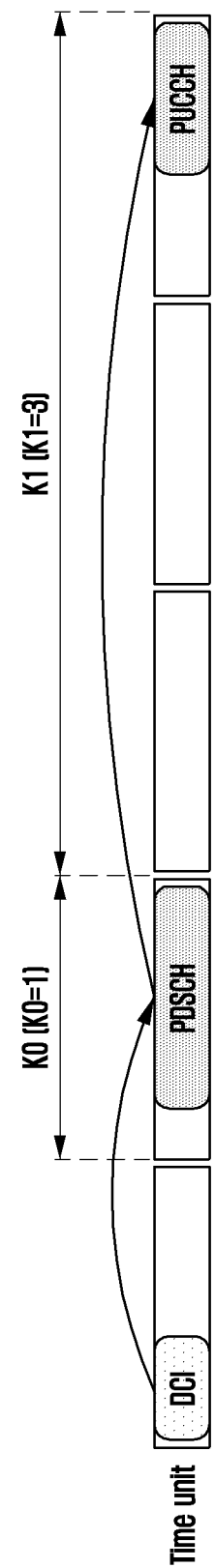
FIG. 6A illustrates an example of uplink transmission timing according to some embodiments of the present disclosure.

In an example, the UE receives the DCI and receives the PDSCH based on time domain resources indicated by the DCI. For example, a parameter K0 may be used to represent a time interval between the PDSCH scheduled by the DCI and the PDCCH carrying the DCI, and K0 may be in units of slots. For example, FIG. 6A gives an example in which K0=1. In the example illustrated in FIG. 6A, the time interval between the PDSCH scheduled by the DCI and the PDCCH carrying the DCI is one slot.

Figure 6B:
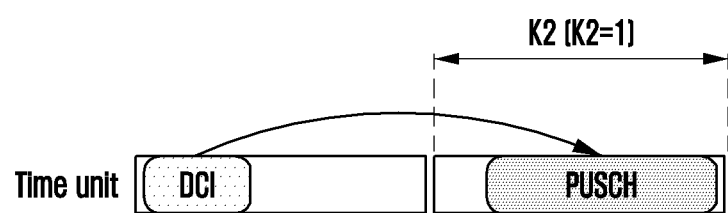
FIG. 6B illustrates an example of uplink transmission timing according to some embodiments of the present disclosure.

In another example, the UE receives the DCI and transmits the PUSCH based on time domain resources indicated by the DCI. For example, a parameter K2 may be used to represent a time interval between the PUSCH scheduled by the DCI and the PDCCH carrying the DCI, and K2 may be in units of slots. For example, FIG. 6B gives an example in which K2=1. In the example illustrated in FIG. 6B, the time interval between the PUSCH scheduled by the DCI and the PDCCH carrying the DCI is one slot.

In yet another example, the UE receives the PDSCH, and may transmit HARQ-ACK information for the PDSCH in a PUCCH in the uplink time unit. For example, a parameter K1 may be used to represent a time interval between the PUCCH for transmitting the HARQ-ACK information for the PDSCH and the PDSCH, and K1 may be in units of uplink time units, such as slots or subslots. In a case where K1 is in units of slots, the time interval is a value of a slot offset between the PUCCH for feeding back the HARQ-ACK information for the PDSCH and the PDSCH. For example, FIG. 6A gives an example in which K1=3. In the example illustrated in FIG. 6A, the time interval between the PUCCH for transmitting the HARQ-ACK information for the PDSCH and the PDSCH is 3 slots.

Figure 6C:
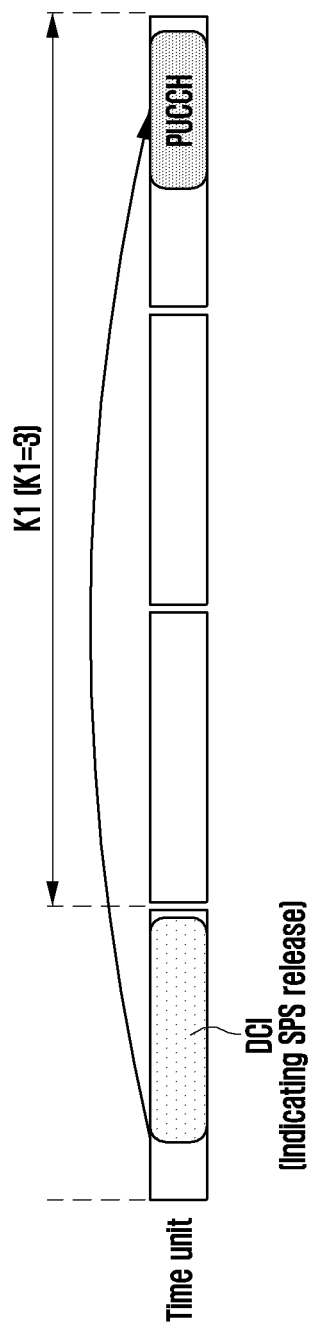
FIG. 6C illustrates an example of uplink transmission timing according to some embodiments of the present disclosure.

In yet another example, the UE receives the DCI (e.g., DCI indicating SPS (Semi-Persistent Scheduling) PDSCH release (deactivation)), and may transmit HARQ-ACK information for the DCI in the PUCCH in the uplink time unit. For example, the parameter K1 may be used to represent a time interval between the PUCCH for transmitting the HARQ-ACK information for the DCI and the DCI, and K1 may be in units of uplink time units, such as slots or sub slots. For example, FIG. 6C gives an example in which K1=3. In the example of FIG. 6C, the time interval between the PUCCH for transmitting the HARQ-ACK information for the DCI and the DCI is 3 slots. For example, the parameter K1 may be used to represent a time interval between an SPS PDSCH reception and the PUCCH feeding back HARQ-ACK thereof, where K1 is indicated in DCI activating the SPS PDSCH.

In some implementations, in step S520, the UE may report (or signal/transmit) a UE capability to the base station or indicate the UE capability. For example, the UE reports (or signals/transmits) the UE capability to the base station by transmitting the PUSCH. In this case, the UE capability information is included in the PUSCH transmitted by the UE.

In some implementations, the base station may configure higher layer signaling for the UE based on a UE capability previously received from the UE (for example, in step S510 in the previous downlink-uplink transmission processes). For example, the base station configures the higher layer signaling for the UE by transmitting the PDSCH. In this case, the higher layer signaling configured for the UE is included in the PDSCH transmitted by the base station. It should be noted that the higher layer signaling is higher layer signaling compared with physical layer signaling, for example, the higher layer signaling may, for example, include RRC signaling and/or a MAC CE.

In some implementations, the UE may be configured with two levels of priorities for uplink transmissions. For example, the two levels of priorities may include a first priority and a second priority which are different from each other. In an example, the first priority may be higher than the second priority. In another example, the first priority may be lower than the second priority. However, the embodiments of the disclosure are not limited to this, and for example, the UE may be configured with more than two levels of priorities. For the sake of convenience, in embodiments of the disclosure, description will be made considering that the first priority is higher than the second priority. It should be noted that all embodiments of the disclosure are applicable to situations where the first priority may be higher than the second priority; all embodiments of the disclosure are applicable to situations where the first priority may be lower than the second priority; and all embodiments of the disclosure are applicable to situations where the first priority may be equal to the second priority.

In embodiments of the disclosure, unicast may refer to a manner in which a network communicates with one UE, and groupcast/broadcast may refer to a manner in which a network communicates with multiple UEs. For example, the unicast PDSCH may be one PDSCH received by one UE, and the scrambling of the PDSCH may be based on a Radio Network Temporary Identifier (RNTI) specific to the UE, e.g., C-RNTI. The unicast PDSCH may also be a unicast SPS PDSCH. The groupcast/broadcast PDSCH may be one PDSCH received by more than one UE simultaneously, and the scrambling of the groupcast/broadcast PDSCH may be based on a UE-group common RNTI. For example, the UE-group common RNTI for scrambling the groupcast/broadcast PDSCH may include an RNTI (referred to as G-RNTI in embodiments of the disclosure) for scrambling of a dynamically scheduled groupcast/broadcast transmission (e.g., PDSCH) or an RNTI (referred to as GS-RNTI in embodiments of the disclosure) for scrambling of a groupcast/broadcast SPS transmission (e.g., SPS PDSCH). The GS-RNTI and the G-RNTI may be different RNTIs or same RNTI. UCI(s) of the unicast PDSCH may include HARQ-ACK information, SR, or CSI of the unicast PDSCH. UCI(s) of the groupcast (or multicast)/broadcast PDSCH may include HARQ-ACK information for the groupcast/broadcast PDSCH. In embodiments of the disclosure, "groupcast/broadcast" may refer to at least one of multicast or broadcast.

In some implementations, the HARQ-ACK codebook may include HARQ-ACK information for one or more PDSCHs and/or DCI. If the HARQ-ACK information for one or more PDSCHs and/or DCI is transmitted in a same uplink time unit, the UE may generate the HARQ-ACK codebook based on a predefined rule. For example, if a PDSCH is successfully decoded, the HARQ-ACK information for this PDSCH is positive ACK. For example, the positive ACK may be represented by 1 in the HARQ-ACK codebook. If a PDSCH is not successfully decoded, the HARQ-ACK information for this PDSCH is Negative ACK (NACK). For example, NACK may be represented by 0 in the HARQ-ACK codebook. For example, the UE may generate the HARQ-ACK codebook based on the pseudo code specified by protocols. In an example, if the UE receives a DCI format that indicates SPS PDSCH release (deactivation), the UE transmits HARQ-ACK information for the DCI format. In another example, if the UE receives a DCI format that indicates secondary cell dormancy, the UE transmits the HARQ-ACK information for the DCI format. In yet another example, if the UE receives a DCI format that indicates to transmit HARQ-ACK information of all HARQ-ACK processes (for example, a one shot HARQ-ACK codebook, and for another example, a Type-3 HARQ-ACK codebook in 3GPP (e.g., TS38.213)), the UE transmits the HARQ-ACK information of all HARQ-ACK processes. In yet another example, if the UE receives a DCI format that schedules a PDSCH, the UE transmits HARQ-ACK information for the PDSCH. In yet another example, the UE receives an SPS PDSCH, and the UE transmits HARQ-ACK information for the SPS PDSCH. In yet another example, if the UE is configured by higher layer signaling to receive an SPS PDSCH, the UE transmits HARQ-ACK information for the SPS PDSCH. If the UE is configured by higher layer signaling to receive an SPS PDSCH, the SPS PDSCH may be cancelled by other signaling. In yet another example, if at least one uplink symbol (e.g., OFDM symbol) in a semi-static frame structure configured by higher layer signaling of the UE overlaps with a symbol of an SPS PDSCH, the UE does not receive the SPS PDSCH. In yet another example, if the UE is configured by higher layer signaling to receive an SPS PDSCH according to a predefined rule, the UE transmits HARQ-ACK information for the SPS PDSCH.

In some implementations, if HARQ-ACK information transmitted in a same uplink time unit does not include HARQ-ACK information for any DCI format, nor does it include HARQ-ACK information for a dynamically scheduled PDSCH (e.g., a PDSCH scheduled by a DCI format) and/or DCI, or the HARQ-ACK information transmitted in the same uplink time unit includes only HARQ-ACK information for one or more SPS PDSCHs, the UE may generate HARQ-ACK information according to a rule for generating an SPS PDSCH HARQ-ACK codebook.

In some implementations, if HARQ-ACK information transmitted in a same uplink time unit includes HARQ-ACK information for any DCI format, and/or HARQ-ACK information for a dynamically scheduled PDSCH (e.g., a PDSCH scheduled by a DCI format) and/or DCI, the UE may generate HARQ-ACK information according to a rule for generating a HARQ-ACK codebook for the dynamically scheduled PDSCH and/or the DCI. For example, the UE may determine to generate a semi-static HARQ-ACK codebook (e.g., Type-1 HARQ-ACK codebook in 3GPP) or a dynamic HARQ-ACK codebook (e.g., Type-2 HARQ-ACK codebook in 3GPP (e.g., TS 38.213)) according to a PDSCH HARQ-ACK codebook configuration parameter (e.g., the parameter of pdsch-HARQ-ACK-Codebook in 3GPP (e.g., TS 38.213)). The dynamic HARQ-ACK codebook may also be an enhanced dynamic HARQ-ACK codebook (e.g., Type-2 HARQ-ACK codebook based on grouping and HARQ-ACK retransmission in 3GPP (e.g., TS 38.213)).

In some implementations, the dynamic HARQ-ACK codebook and/or the enhanced dynamic HARQ-ACK codebook may determine a size and an order of the HARQ-ACK codebook according to an assignment index. For example, the assignment index may be a DAI (Downlink Assignment Index). In the following embodiments, an example in which the assignment index is the DAI is taken for illustration. However, the embodiments of the disclosure are not limited thereto, and any other suitable assignment index may be adopted.

In some implementations, a DAI field includes at least one of a first type of DAI and a second type of DAI.

In some examples, the first type of DAI may be a C-DAI (Counter-DAI). The first type of DAI may indicate an accumulative number of at least one of DCI scheduling PDSCH(s), DCI indicating SPS PDSCH release (deactivation), or DCI indicating secondary cell dormancy. For example, the accumulative number may be an accumulative number up to the current serving cell and/or the current time unit. For example, C-DAI may refer to: an accumulative number of {serving cell, time unit} pair(s) scheduled by PDCCH(s) up to the current time unit within a time window (which may also include a number of PDCCHs (e.g., PDCCHs indicating SPS release and/or PDCCHs indicating secondary cell dormancy)); or an accumulative number of PDCCH(s) up to the current time unit; or an accumulative number of PDSCH transmission(s) up to the current time unit; or an accumulative number of {serving cell, time unit} pair(s) in which PDSCH transmission(s) related to PDCCH(s) (e.g., scheduled by the PDCCH(s)) and/or PDCCH(s) (e.g., PDCCH indicating SPS release and/or PDCCH indicating secondary cell dormancy) is present, up to the current serving cell and/or the current time unit; or an accumulative number of PDSCH(s) with corresponding PDCCH(s) and/or PDCCHs (e.g., PDCCHs indicating SPS release and/or PDCCHs indicating secondary cell dormancy) already scheduled by a base station up to the current serving cell and/or the current time unit; or an accumulative number of PDSCHs (the PDSCHs are PDSCHs with corresponding PDCCHs) already scheduled by the base station up to the current serving cell and/or the current time unit; or an accumulative number of time units with PDSCH transmissions (the PDSCHs are PDSCHs with corresponding PDCCHs) already scheduled by the base station up to the current serving cell and/or the current time unit. The order of each bit in the HARQ-ACK codebook corresponding to at least one of PDSCH reception(s), DCI(s) indicating SPS PDSCH release (deactivation), or DCI(s) indicating secondary cell dormancy may be determined by the time when the first type of DAI is received and the information of the first type of DAI. The first type of DAI may be included in a downlink DCI format.

In some examples, the second type of DAI may be a T-DAI (Total-DAI). The second type of DAI may indicate a total number of at least one of all PDSCH receptions, DCI indicating SPS PDSCH release (deactivation), or DCI indicating secondary cell dormancy. For example, the total number may be a total number of all serving cells up to the current time unit. For example, T-DAI may refer to: a total number of {serving cell, time unit} pairs scheduled by PDCCH(s) up to the current time unit within a time window (which may also include a number of PDCCHs for indicating SPS release); or a total number of PDSCH transmissions up to the current time unit; or a total number of {serving cell, time unit} pairs in which PDSCH transmission(s) related to PDCCH(s) (e.g., scheduled by the PDCCH) and/or PDCCH(s) (e.g., a PDCCH indicating SPS release and/or a PDCCH indicating secondary cell dormancy) is present, up to the current serving cell and/or the current time unit; or a total number of PDSCHs with corresponding PDCCHs and/or PDCCHs (e.g., PDCCHs indicating SPS release and/or PDCCHs indicating secondary cell dormancy) already scheduled by a base station up to the current serving cell and/or the current time unit; or a total number of PDSCHs (the PDSCHs are PDSCHs with corresponding PDCCHs) already scheduled by the base station up to the current serving cell and/or the current time unit; or a total number of time units with PDSCH transmissions (for example, the PDSCHs are PDSCHs with corresponding PDCCHs) already scheduled by the base station up to the current serving cell and/or the current time unit. The second type of DAI may be included in the downlink DCI format and/or an uplink DCI format. The second type of DAI included in the uplink DCI format is also referred to as UL DAI.

In the following examples, the first type of DAI as the C-DAI and the second type of DAI as the T-DAI are taken as an example for illustration, but the examples are not limited thereto.

Tables 1 and 2 show a correspondence between the DAI field and $V_{T-DAI,m}$ or $V_{C-DAI,c,m}$. Numbers of bits of the C-DAI and T-DAI are limited.

For example, in a case where the C-DAI or T-DAI is represented with 2 bits, the value of the C-DAI or T-DAI in the DCI may be determined by equations in Table 1. $V_{T-DAI,m}$ is the value of the T-DAI in DCI received in a PDCCH Monitoring Occasion m, and $V_{C-DAI,c,m}$ is the value of the C-DAI in DCI for a serving cell c received in the PDCCH monitoring occasion m. Both $V_{T-DAI,m}$ and $V_{C-DmI,c,m}$ are related to a number of bits of the DAI field in the DCI. MSB is the Most Significant Bit and LSB is the Least Significant Bit.

TABLE 1

| MSB, LSB of DAI Field | $V_{T-DAI, m}$ or $V_{C-DAI, c, m}$ | Y |
|---|---|---|
| 0, 0 | 1 | (Y − 1) mod 4 + 1 = 1 |
| 0, 1 | 2 | (Y − 1) mod 4 + 1 = 2 |

TABLE 1-continued

| MSB, LSB of DAI Field | $V_{T\text{-}DAI, m}$ or $V_{C\text{-}DAI, c, m}$ | Y |
|---|---|---|
| 1, 0 | 3 | (Y − 1) mod 4 + 1 = 3 |
| 1, 1 | 4 | (Y − 1) mod 4 + 1 = 4 |

For example, when the C-DAI or T-DAI is 1, 5 or 9, as shown in Table 1, all of the DAI fields are indicated with "00", and the value of $V_{T\text{-}DAI,m}$ or $V_{C\text{-}DAI,c,m}$ is represented as "1" by the equation in Table 1. Y may represent the value of the DAI corresponding to the number of DCIS actually transmitted by the base station (the value of the DAI before conversion by the equation in the table).

For example, in a case where the C-DAI or T-DAI in the DCI is 1 bit, values greater than 2 may be represented by equations in Table 2.

TABLE 2

| DAI field | $V_{T\text{-}DAI, m}$ or $V_{C\text{-}DAI, c, m}$ | Y |
|---|---|---|
| 0 | 1 | (Y − 1) mod 2 + 1 = 1 |
| 1 | 2 | (Y − 1) mod 2 + 1 = 2 |

It should be noted that, unless the context clearly indicates otherwise, all or one or more of the methods, steps or operations described in embodiments of the disclosure may be specified by protocol and/or configured by higher-level signaling and/or indicated by dynamic signaling. The dynamic signaling may be PDCCH and/or DCI and/or DCI format. For example, SPS PDSCH and/or CG PUSCH may be dynamically indicated in corresponding activated DCI/DCI format/PDCCH. All or one or more of the described methods, steps and operations may be optional. For example, if a certain parameter (e.g., parameter X) is configured, the UE performs a certain approach (e.g., approach A), otherwise (if the parameter, e.g., parameter X, is not configured), the UE performs another approach (e.g., approach B).

It should be noted that, a PCell (Primary Cell) or PSCell (Primary Secondary Cell) in embodiments of the disclosure may be used interchangeably with a cell having a PUCCH.

It should be noted that, methods for downlink in embodiments of the disclosure may also be applicable to uplink, and methods for uplink may also be applicable to downlink. For example, a PDSCH may be replaced with a PUSCH, an SPS PDSCH may be replaced with CG PUSCH, and downlink symbols may be replaced with uplink symbols, so that methods for downlink may be applicable to uplink.

It should be noted that, methods applicable to multiple PDSCH/PUSCH scheduling in embodiments of the disclosure may also be applicable to a PDSCH/PUSCH transmission with repetitions. For example, a PDSCH/PUSCH of multiple PDSCH/PUSCHs may be replaced by a repetition of multiple repetitions of the PDSCH/PUSCH transmission.

It should be noted that in methods of the disclosure, "configured and/or indicated with a transmission with repetitions" may be understood that the number of the repetitions of the transmission is greater than 1. For example, "configured and/or indicated with a transmission with repetitions" may be replaced with "PUCCH repeatedly transmitted on more than one slot/sub-slot". "Not configured and/or indicated with a transmission with repetitions" may be understood that the number of the repetitions of the transmission equals to 1. For example, "PUCCH that is not configured and/or indicated with repetitions" may be replaced by "PUCCH transmission with the number of the repetitions of 1". For example, the UE may be configured with a parameter $N_{PUCCH}^{repeat}$ related to the number of repetitions of PUCCH; When the parameter $N_{PUCCH}^{repeat}$ is greater than 1, it may mean that the UE is configured with a PUCCH transmission with repetitions, and the UE may repeat the PUCCH transmission on $N_{PUCCH}^{repeat}$ time units (e.g., slots); when the parameter is equal to 1, it may mean that the UE is not configured with a PUCCH transmission with repetitions. For example, the repeatedly transmitted PUCCH may contain only one type of UCI. If the PUCCH is configured with repetitions, in embodiments of the disclosure, a repetition of the multiple repetitions of the PUCCH may be used as a PUCCH (or a PUCCH resource), or all of the repetitions of the PUCCH may be used as a PUCCH (or a PUCCH resource), or a specific repetition of the multiple repetitions of the PUCCH may be used as a PUCCH (or a PUCCH resource).

It should be noted that, in methods of the disclosure, a DCI format schedules multiple PDSCHs/PUSCHs, which may be multiple PDSCHs/PUSCHs of a same serving cell and/or multiple PDSCHs/PUSCHs of different serving cells.

It should be noted that the multiple manners described in the disclosure may be combined in any order. In a combination, a manner may be performed one or more times.

It should be noted that, steps of methods according to embodiments of the disclosure may be implemented in any order.

It should be noted that, in methods of the disclosure, "canceling a transmission" may mean canceling the transmission of the entire uplink channel and/or cancelling the transmission of a part of the uplink channel.

It should be noted that, in methods of the disclosure, an "ascending order" may be replaced by a "descending order", and/or a "descending order" may be replaced by an "ascending order".

It should be noted that, in methods of the disclosure, a PUCCH/PUSCH carrying A may be understood as a PUCCH/PUSCH only carrying A, and may also be understood as a PUCCH/PUSCH carrying at least A.

It should be noted that, in methods of the disclosure, for a noun, methods of the disclosure may be applicable to one and/or multiple such nouns. The article "a" may also be replaced by "multiple" or "more than one", and "multiple" or "more than one" may also be replaced by "a".

It should be noted that "slot" may be replaced by "sub-slot" or "time unit" in embodiments of the disclosure.

It should be noted that "at least one" in embodiments of the disclosure may be understood as "one" or "multiple". In the case of "multiple", it may be any permutation and combination. For example, at least one of "A", "B" and "C" may be: "A", "B", "C", "AB", "BA", "ABC", "CBA", "ABCA", "ABCCB", etc.

Figure 7:
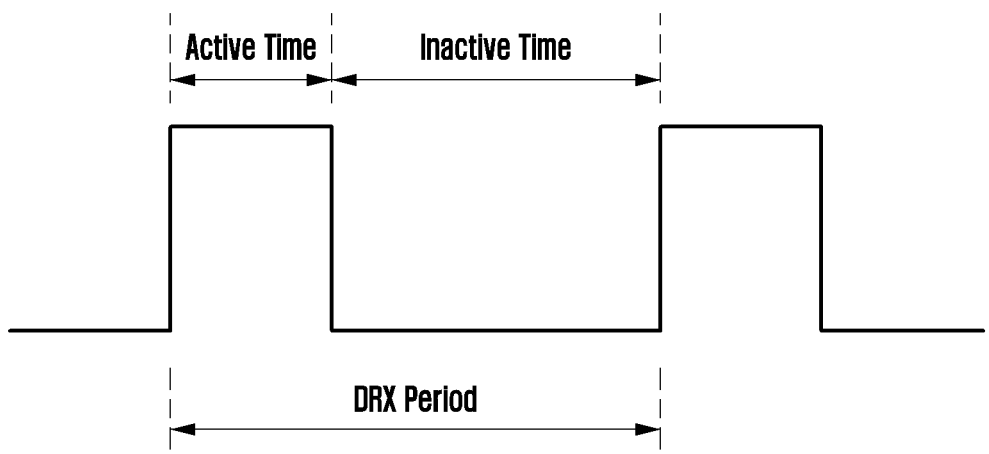
FIG. 7 illustrates a schematic diagram of a DRX mechanism according to some embodiments of the present disclosure.

In some communication systems (e.g., NR), it is supported to reduce the unnecessary PDCCH monitoring behavior of a UE by adopting the DRX technology, thereby reducing the energy consumption of the UE. A base station may configure DRX periods for the UE, and each DRX period includes Active Time and Inactive Time, as shown in FIG. 7. In the active time (which may also be referred to as an active state) of a DRX mode, the UE monitors a DCI or a PDCCH carrying the DCI (e.g., a predefined PDCCH, such as a PDCCH for data scheduling). In the inactive time (which may also be referred to as an inactive state) of the DRX mode, the UE does not monitor the DCI or the PDCCH carrying the DCI (e.g., the predefined PDCCH, such as the PDCCH for data scheduling) to save the energy consumption of the UE. For example, the PDCCH may include at least one of: a PDCCH scrambled with a C-RNTI, a PDCCH scrambled with a CI-RNTI (Cancellation Indication RNTI), a PDCCH scrambled with a CS-RNTI (Configured Scheduling RNTI), a PDCCH scrambled with an INT-RNTI (Interruption RNTI), a PDCCH scrambled with an SFI-RNTI (Slot Format Indication RNTI), a PDCCH scrambled with an SP-CSI-RNTI (Semi-Persistent CSI RNTI), a PDCCH scrambled with a TPC-PUCCH-RNTI (Transmit Power Control-PUCCH-RNTI), a PDCCH scrambled with a TPC-PUSCH-RNTII (Transmit Power Control-PUSCH-RNTI), a PDCCH scrambled with a TPC-SRS-RNTI (Transmit Power Control-Sounding Reference Signal-RNTI), and a PDCCH scrambled with an AI-RNTI.

When a DRX cycle is configured, an active time of serving cells in a DRX group (the DRX group may, for example, represent a group of serving cells with the same DRX active time) may include the time while:

a DRX ON duration timer (e.g., 3GPP parameter drx-onDurationTimer) or a DRX inactivity timer (e.g., 3GPP parameter drx-InactivityTimer) configured for the DRX group is running; or a DRX downlink retransmission timer (e.g., 3GPP parameter drx-RetransmissionTimerDL) or a DRX uplink retransmission timer (e.g., 3GPP parameter drx-RetransmissionTimerUL) is running on any serving cell in the DRX group; or an initial access contention resolution timer (e.g., 3GPP parameter ra-ContentionResolutionTimer) or a msgB response window (e.g., 3GPP parameter msgB-ResponseWindow) is running; or a scheduling request is sent on a PUCCH and is pending; or a PDCCH indicating a new transmission that is scrambled by a C-RNTI of a MAC entity has not been received after successfully reception of a random access response for a contention-based random access preamble not selected by the MAC entity.

In some implementations, the active time or the inactive time of the UE may be determined based on a timer (or referred to as a timer related to DRX). That is, the timer may be used to control the active time or the inactive time of the UE. For example, the timer may include one or more of an ON duration timer (or referred to as a timer related to an ON duration of the DRX mode) (e.g., 3GPP parameter drx-onDurationTimer), an inactivity timer (e.g., 3GPP parameter drx-InactivityTimer), a Round-Trip Time (RTT) timer (or referred to as a timer related to round-trip time of a HARQ process) and a retransmission timer (or referred to as a timer related to retransmission). In some examples, the UE may support other timers (such as a predefined or preset timer, or any existing suitable timer) for the DRX mode.

For example, the ON duration timer may be used to determine a default duration during which the UE may be in the active time (e.g., an ON duration of the DRX period). For example, the inactivity timer may be used to determine a duration during which it is maintained in the active time after a PDCCH (or DCI) is received. For example, the RTT timer may be used to determine the minimum duration until a DL assignment for a retransmission or a grant for a UL retransmission may be received. For example, the retransmission timer may be used to determine the maximum duration until a grant for a retransmission may be received.

In some examples, the RTT timer may include a DRX downlink hybrid automatic repeat request round-trip time timer and/or a DRX uplink hybrid automatic repeat request round-trip time timer. The retransmission timer may include a DRX downlink retransmission timer and/or a DRX uplink retransmission timer.

In some implementations, one or more of the timers (timers related to DRX) described above may be activated (e.g., started or restarted) or deactivated (e.g., stopped or it expires). When a timer is activated, the timer is running; when a timer is deactivated, the timer is not running (is stopped or it expires). For example, when at least one of the ON duration timer, the inactivity timer, the retransmission timer (a UL retransmission timer or a DL retransmission timer) or the initial access contention resolution timer is running, the UE may be in the active time and may monitor DCI or a PDCCH carrying the DCI. For example, a type of the PDCCH may refer to the previous description.

In embodiments of the disclosure, drx-HARQ-RTT-TimerDL is taken as an example (but not limited thereto) to illustrate the usage of the DRX downlink hybrid automatic repeat request round-trip time timer; drx-HARQ-RTT-TimerUL is taken as an example (but not limited thereto) to illustrate the usage of the DRX uplink hybrid automatic repeat request round-trip time timer; drx-RetransmissionTimerDL is taken as an example (but not limited thereto) to illustrate the usage of the DRX downlink retransmission timer; drx-RetransmissionTimerUL is taken as an example (but not limited thereto) to illustrate the usage of the DRX uplink retransmission timer. For example, the DRX downlink hybrid automatic repeat request round-trip time timer (e.g., the drx-HARQ-RTT-TimerDL) may represent the minimum duration before a DL assignment for HARQ retransmission is expected by the MAC entity. For example, the DRX uplink hybrid automatic repeat request round-trip time timer may represent the minimum duration before a UL HARQ retransmission grant is expected by the MAC entity. For example, the drx-RetransmissionTimerDL may represent the maximum duration until a grant for DL retransmission is received. For example, drx-RetransmissionTimerUL may represent the maximum duration until a grant for UL retransmission is received.

When the DRX cycle is configured, the MAC entity shall:
1>if a MAC PDU (Packet Data Unit) is received in a configured downlink assignment:
2>start the drx-HARQ-RTT-TimerDL for the corresponding HARQ process in the first symbol after the end of the corresponding transmission carrying the DL HARQ feedback;
2>stop the drx-RetransmissionTimerDL for the corresponding HARQ process.
1>if the drx-HARQ-RTT-TimerDL expires:
2>if the data of the corresponding HARQ process is not successfully decoded:
3>starts the drx-RetransmissionTimerDL for the corresponding HARQ process in the first symbol after the expiry of the drx-HARQ-RTT-TimerDL.

When the DRX cycle is configured, the MAC entity shall:
1>if a DRX group is in the active time:
2>monitor the PDCCH on the serving cell in the DRX group, for example, the PDCCH may be monitored according to the method specified in 3GPP TS 38.213;
2>if the PDCCH indicates a DL transmission:
3>start the drx-HARQ-RTT-TimerDL for the corresponding HARQ process in the first symbol after the end of the corresponding transmission carrying the DL HARQ feedback;
3>stop the drx-RetransmissionTimerDL for the corresponding HARQ process.

For a HARQ process, if the corresponding transmission carrying the DL HARQ feedback is cancelled (for example, an uplink transmission with a lower priority is cancelled by an uplink transmission with a higher priority; for another example, a HARQ-ACK transmission for an SPS PDSCH is cancelled by a symbol that is semi-statically configured as downlink), since the UE has stopped the drx-RetransmissionTimerDL for the corresponding HARQ process, the UE may enter the inactive time (for example, other timers related to DRX cannot satisfy a condition for entering the active time). At this time, the UE may not be able to receive a retransmission of the HARQ process and/or a retransmission of the DL HARQ feedback scheduled by the base station.

In some implementations, it may be specified by protocols and/or configured by higher layer signaling that, for a HARQ process, in case that the corresponding transmission carrying the DL HARQ feedback is cancelled and/or delayed, it is performed in a predetermined time based on at least one of the following Manners A_1 to A_3.

Manner A_1: starting a predetermined timer (referred to as a first predetermined timer for the convenience of description) for the corresponding HARQ process. For example, if the predetermined timer is running, it is considered (e.g., determined) that the UE is in the active time. In some examples, whether the UE is in the active time may be defined for a DRX group. For example, the UE being in the active time may mean that all serving cells of one or more serving cells in a DRX group are in the active time. In other examples, whether the UE is in the active time may be defined for a serving cell. For example, the UE being in the active time may mean that a serving cell corresponding to this HARQ process is in the active time.

Manner A_2: starting the drx-RetransmissionTimerDL for the corresponding HARQ process.

Manner A_3: in case that the data of the corresponding HARQ process is not successfully decoded, starting the drx-RetransmissionTimerDL for the corresponding HARQ process.

For example, the predetermined time may be at least one of the following times specified by protocols and/or configured by higher layer signaling:

the first symbol after the end of the corresponding transmission carrying the DL HARQ feedback (referred to as "a first time" in embodiments of the disclosure for the convenience of description);

a start of a subframe or slot or subslot or symbol after the end of the corresponding transmission carrying the DL HARQ feedback (referred to as "a second time" in embodiments of the disclosure for the convenience of description);

the first symbol after the end of the PDCCH reception (referred to as "a third time" in embodiments of the disclosure for the convenience of description);

the first symbol after the drx-HARQ-RTT-TimerDL expires (referred to as "a fourth time" in embodiments of the disclosure for the convenience of description);

the first symbol after the drx-HARQ-RTT-TimerUL expires (referred to as "a fifth time" in embodiments of the disclosure for the convenience of description);

the first symbol after the end of the first repetition or the last repetition of the corresponding transmission carrying the DL HARQ feedback (referred to as "a sixth time" in embodiments of the disclosure for the convenience of description);

the first symbol after the UE successfully receives the random access response for the contention-based random access preamble not selected by the MAC entity (referred to as "a seventh time" in embodiments of the disclosure for the convenience of description);

a start of a subframe or slot or subslot or symbol after the UE successfully receives the random access response for the contention-based random access preamble not selected by the MAC entity (referred to as "an eighth time" in embodiments of the disclosure for the convenience of description).

By starting one or more timers for the corresponding HARQ process in at least one of the times described above, it can enable the UE to receive the retransmission of the HARQ process and/or the retransmission of the DL HARQ feedback scheduled by the base station in time, thereby reducing the user plane delay and improving the transmission reliability.

It should be noted that the predetermined time may also be other times defined by protocols, for example, a time when drx-InactivityTimer for a DRX group expires that is defined in 3GPP TS 38.321.

It should be noted that, in embodiments of the disclosure, the corresponding transmission carrying the DL HARQ feedback may be a cancelled and/or delayed corresponding transmission carrying the DL HARQ feedback. Or, the corresponding transmission carrying the DL HARQ feedback in embodiments of the disclosure may be a corresponding transmission carrying the DL HARQ feedback that has actually been transmitted. The corresponding transmission may be a PUCCH transmission and/or a PUSCH transmission.

The method specifies the behavior of the UE when the corresponding transmission carrying the DL HARQ feedback is cancelled and/or delayed, which can enable the UE to receive the retransmission of the HARQ process and/or the retransmission of the DL HARQ feedback scheduled by the base station in time, thereby reducing the user plane delay and improving the transmission reliability.

If the UE is configured with a dynamic HARQ-ACK codebook, the UE may determine (e.g., detect) missing detection for DCI (missing of the DCI; or there is undetected DCI)) by the DAI. For example, the base station schedules DCI#1 and DCI#2 for the UE, indicating that HARQ-ACK is transmitted in a same uplink time unit (e.g., slot n), where the DCI#1 schedules a PDSCH#1 with a HARQ process of 1, and indicates that the C-DAI is 1, and the DCI#2 schedules a PDSCH#2 with a HARQ process of 2, and indicates that the C-DAI is 2. The UE only receives the DCI#2 and PDSCH#2, the PDSCH#2 is successfully decoded, and the HARQ-ACK codebook transmitted by the UE in the uplink time unit (e.g., slot n) is {NACK, ACK}. Since the UE does not restart the drx-RetransmissionTimerDL for the HARQ process of 1, the UE may enter the inactive time, and the UE may not be able to receive the retransmission of the HARQ process scheduled by the base station.

In some implementations, it may be specified by protocols and/or configured by higher layer signaling that, if the UE detects the missing detection for DCI (for example, missing of the DCI) or the UE determines that there is undetected DCI, at least one of the following Manners B_1 to B_4 is performed in a predetermined time.

Manner B_1: starting a predetermined timer (referred to as a second predetermined timer for the convenience of description). For example, if the predetermined timer is running, it is considered (e.g., determined) that the UE is in the active time. It should be noted that the UE being in the active time may be defined for all DRX groups. For example, the predetermined timer is a common timer for different DRX groups. It should be noted that the second predetermined timer may be a same timer as the aforementioned first predetermined timer, or may be a different timer.

Manner B_2: starting or restarting the drx-InactivityTimer. For example, the drx-InactivityTimer is started or restarted for each DRX group. For another example, the drx-InactivityTimer is started or restarted for a certain DRX group.

Manner B_3: starting or restarting the drx-HARQ-RTT-TimerDL for a predetermined HARQ process.

Manner B_4: starting or restarting the drx-RetransmissionTimerDL for the predetermined HARQ process.

By performing at least one of Manners B_1 to B_4 in the predetermined time (e.g., one of the above first time to eighth time), it can enable the UE to receive the retransmission of the HARQ process scheduled by the base station in time, thereby reducing the user plane delay and improving the transmission reliability.

In an instance, the predetermined HARQ process may be a HARQ process without feedback of HARQ information. For example, in this instance, the predetermined HARQ process may be a HARQ process other than the HARQ process 2. In another example, the predetermined HARQ process may also be all HARQ processes. In yet another example, the predetermined HARQ process may also be a certain HARQ process, for example, a HARQ process corresponding to the drx-HARQ-RTT-TimerDL that expires.

In some examples, it may be specified by protocols and/or configured by higher layer signaling that, if the UE detects the missing detection for DCI and a predefined condition is satisfied, at least one of the above Manners B_1 to B_4 is performed in the predetermined time. For example, the predefined condition may be at least one of the following Conditions C_1 to C_3:

Condition C_1: the drx-HARQ-RTT-TimerDL for a HARQ process expires.

Condition C_2: there may be missing detection for a PDSCH corresponding to a HARQ process, for example, DCI scheduling the PDSCH corresponding to the HARQ process is not detected.

Condition C_3: HARQ-ACK information corresponding to a HARQ process is NACK.

For example, the predetermined time may be the time defined in other embodiments of the disclosure, for example, one of the above first time to eighth time. For another example, the predetermined time may also be other times defined by protocols.

The method specifies the behavior of the UE when the UE detects the missing detection for the DCI, which can prevent the UE from entering the inactive time due to the missing detection for the DCI, and enable the UE to receive the retransmission of the HARQ process scheduled by the base station in time, thereby reducing the user plane delay, improving the transmission reliability, and improving the system spectrum efficiency.

In some implementations, the UE may be configured with a PUCCH transmission with repetitions. For example, HARQ-ACK information may be repeatedly transmitted. It may be specified by protocols and/or configured by higher layer signaling that, when the DRX cycle is configured, the MAC entity shall:
1>if a MAC PDU (Packet Data Unit) is received in a configured downlink assignment:
2>start the drx-HARQ-RTT-TimerDL for the corresponding HARQ process in a predetermined time.

Or, it may be specified by protocols and/or configured by higher layer signaling that, when the DRX cycle is configured, the MAC entity shall:
1>if the DRX group is in the active time:
2>monitor a PDCCH on the serving cell in the DRX group, for example, the PDCCH may be monitored according to the method specified in 3GPP TS 38.213;
2>if the PDCCH indicates a DL transmission:
3>start the drx-HARQ-RTT-TimerDL for the corresponding HARQ process in the predetermined time.

For example, the predetermined time may be the first symbol after the end of the first repetition or the last repetition of the corresponding transmission carrying the DL HARQ feedback. For another example, the predetermined time may also be the time defined in other embodiments of the disclosure, for example, one of the above first time to eighth time. For another example, the predetermined time may also be other times defined by protocols.

The method specifies the behavior of the UE when the HARQ-ACK is repeatedly transmitted, which can reduce the time for the base station to schedule the retransmission, and enable the UE to receive the retransmission of the HARQ process scheduled by the base station in time, thereby reducing the user plane delay, improving the transmission reliability and improving the system spectrum efficiency.

In some cases, if a PDCCH that indicates a new transmission and is scrambled by the C-RNTI of the MAC entity has not been received after the UE successfully receives the random access response for the contention-based random access preamble not selected by the MAC entity, the UE will be in the active time. For some specific services, the base station may transmit data (e.g., a SPS PDSCH) or receive data (e.g., a CG PUSCH) in a scheduling-free (e.g., configured grant) way. For the activation and retransmission of the SPS PDSCH and the CG PUSCH, the base station adopts a CS-RNTI to scramble a PDCCH (DCI). At this time, if the UE does not receive the PDCCH indicating the new transmission that is scrambled by the C-RNTI, the UE will always be in the active time, thus increasing the power consumption of the UE.

It may be specified by protocols and/or configured by higher layer signaling that, if at least one of the following Conditions D_1 and D_2 is satisfied after the UE successfully receives the random access response for the contention-based random access preamble not selected by the MAC entity, the UE is in the active time:

Condition D_1: the UE does not receive the PDCCH indicating the new transmission that is scrambled by the C-RNTI and the UE does not receive the PDCCH scrambled by the CS-RNTI.

It should be noted that the PDCCH scrambled by the CS-RNTI may be at least one of: a PDCCH activating an SPS PDSCH, a PDCCH activating a CG PUSCH, a PDCCH scheduling retransmission of an SPS PDSCH, and a PDCCH scheduling retransmission of a CG PUSCH.

Condition D_2: a predetermined timer (referred to as a third predetermined timer for the convenience of description) is running.

It should be noted that the predetermined timer may be started or restarted in a predetermined time. The predetermined time may be the time defined in other embodiments of the disclosure, for example, one of the above first time to eighth time. For another example, the predetermined time may also be other times defined by protocols. The predetermined timer may be one of the timers in various embodiments of the disclosure.

The method can reduce the time when the UE is in the active time, thereby reducing the power consumption of the UE and increasing the battery life of the UE.

In some cases, when the UE receives a PDCCH indicating SPS PDSCH activation, the UE will start the drx-InactivityTimer to make the UE enter the active time. For some services, the base station may only adopt the scheduling-free (e.g., configured grant) way. For example, the UE only uses one SPS PDSCH configuration for transmission. After the SPS PDSCH configuration is activated, the base station transmits an SPS PDSCH to the UE, and the base station does not transmit a PDCCH scheduling a new transmission of a PDSCH to the UE. At this time, if the UE continues to monitor the PDCCH, the power consumption of the UE will increase.

It may be specified by protocols and/or configured by higher layer signaling that, if the UE receives a PDCCH activating an SPS PDSCH and/or a Type-2 configured grant PUSCH (e.g., Type-2 UL Grant PUSCH), the UE starts a predetermined timer (referred to as a fourth predetermined timer for the convenience of description) in a predetermined time.

It should be noted that the predetermined timer may be started or restarted in a predetermined time. The predetermined time may be the time defined in other embodiments of the disclosure, for example, one of the above first time to eighth time. For another example, the predetermined time may also be other times defined by protocols.

The predetermined timer may be applicable to all SPS PDSCH configurations and/or all Type-2 scheduling-free (e.g., configured grant) PUSCH configurations. The predetermined timer may be applicable to a certain SPS PDSCH configuration and/or Type-2 scheduling-free (e.g., configured grant) PUSCH configuration. For example, the predetermined timer may be configured in the SPS PDSCH configuration. The predetermined timer may also reuse the drx-InactivityTimer. For example, different drx-InactivityTimer values may be configured for the SPS PDSCH.

The method can reduce the time when the UE is in the active time, thereby reducing the power consumption of the UE and increasing the battery life of the UE.

In some cases, a packet may have the requirement for the transmission delay. If the packet is not correctly transmitted within the required transmission time, it may not be necessary to continue to transmit the packet. A packet (e.g., a packet of a high layer) may be divided into multiple TBs (Transport Blocks). If any of the TBs is not correctly transmitted within the required transmission time, it may not be necessary to continue to transmit any of the TBs of the packet. At this time, the UE is not required to continue to receive a PDCCH scheduling this packet.

A predetermined timer (e.g., a timer parameter; for the convenience of description, it is referred to as a fifth predetermined timer) may be specified by protocols and/or configured by higher layer signaling. If the UE receives a packet or a PDSCH for a service and/or a PDCCH scheduling a PDSCH for a service, and/or the UE transmits a packet or a PUSCH for a service and/or receives a PDCCH scheduling a PUSCH for a service, the UE starts the predetermined timer in a predefined time. If the predetermined timer expires, at least one of timers for all HARQ processes associated with the packet or the service (e.g., drx-RetransmissionTimerDL, drx-RetransmissionTimerUL, drx-HARQ-RTT-TimerDL or drx-HARQ-RTT-TimerUL) or drx-InactivityTimer is stopped.

The predetermined time may be the time defined in other embodiments of the disclosure, for example, one of the above first time to eighth time. For example, the predetermined time may also be other times defined by protocols.

The predetermined timer parameter may be configured for the service. For example, the predetermined timer parameter may be configured for logical channels and/or logical channel groups, separately. The predetermined timer parameter may also be configured for the SPS PDSCH configuration (or configuration group) and/or the CG PUSCH configuration (or configuration group), separately. The predetermined timer parameter may also be configured for the serving cell (or serving cell group), separately.

The method can reduce the time when the UE is in the active time, thereby reducing the power consumption of the UE and increasing the battery life of the UE.

In some implementations, when the DRX cycle is configured, the MAC entity shall:
1>if a MAC PDU is transmitted in a configured uplink grant, and an LBT (Listen Before Talk) failure indication is not received from lower layers:
2>start the drx-HARQ-RTT-TimerUL for the corresponding HARQ process in the first symbol after the end of the first transmission of the corresponding PUSCH transmission (e.g., the first transmission within a repetition transmission bundle);
2>stop the drx-RetransmissionTimerUL for the corresponding HARQ process in the first transmission of the corresponding PUSCH transmission (e.g., the first transmission within the repetition transmission bundle).
1>if the DRX group is in the active time:
2>monitor a PDCCH of the serving cell in the DRX group, for example, the PDCCH may be monitored according to the method specified in 3GPP TS 38.213;
2>if the PDCCH indicates a UL transmission
2>start the drx-HARQ-RTT-TimerUL for the corresponding HARQ process in the first symbol after the end of the first transmission of the corresponding PUSCH transmission (e.g., the first transmission within the repetition transmission bundle);
3>stop the drx-RetransmissionTimerUL for the corresponding HARQ process.
1>if the drx-HARQ-RTT-TimerUL expires:
2>start the drx-RetransmissionTimerUL for the corresponding HARQ process in the first symbol after the drx-HARQ-RTT-TimerUL expires.

If the PUSCH only contains HARQ-ACK information (for example, does not contain uplink data and/or CSI), the base station will not schedule retransmission of the PUSCH, and the UE is not required to continue to monitor an uplink scheduling PDCCH of the HARQ process.

It may be specified by protocols and/or configured by higher layer signaling that, if only HARQ-ACK information is included in an uplink transmission, at least one of the drx-RetransmissionTimerUL and the drx-HARQ-RTT-TimerUL for the HARQ process associated with the uplink transmission is stopped in a predetermined time (for example, the first symbol after the end of the first transmission of the corresponding PUSCH transmission (e.g., the first transmission within the repetition transmission bundle)).

The method can reduce the time when the UE is in the active time, thereby reducing the power consumption of the UE and increasing the battery life of the UE.

In some cases, data scheduling has a requirement of delay, and if the delay is exceeded, the base station may not schedule a retransmission. At this time, even if the UE continues to monitor a PDCCH, the UE will not receive DCI for scheduling a data retransmission, which will consume the power of the UE. In order to save the power consumption of the UE, the UE may be specified by protocols and/or indicated by signaling to start or stop predefined timer(s). When the UE determines that the data will not be retransmitted, it stops a specific timer, thereby reducing the time for monitoring the PDCCH. For example, at least one of the following Manners MN1~MN3 may be adopted.

Manner MN1

In some implementations, it may be dynamically indicated in a DCI format whether a retransmission of data would be scheduled. For example, it may be explicitly indicated with 1 bit in the DCI format, where the bit of "1" represents that the retransmission would be scheduled, and the bit of "0" represents that the retransmission would not be scheduled. For another example, it may be indicated in an implicit manner.

In an example, it may be indicated in a DCI format 1_1 or 1_2 that whether a retransmission of a PDSCH scheduled by a DCI format would be scheduled, and if the DCI format indicates that the retransmission of the PDSCH would not be scheduled, the UE stops a predefined timer for a HARQ process associated with the PDSCH transmission (e.g., drx-RetransmissionTimerDL and drx-HARQ-RTT-TimerDL) in a predetermined time. The predetermined time may be a time defined in embodiments of the disclosure, for example, the first symbol after the end of the corresponding transmission carrying the DL HARQ feedback. If the DCI format does not indicate that the retransmission of the PDSCH would not be scheduled, the UE starts the predefined timer for the HARQ process associated with the PDSCH transmission (e.g., drx-HARQ-RTT-TimerDL) in the predetermined time.

In an example, it may be indicated in a DCI format 0_1 or 0_2 whether a retransmission of a PUSCH scheduled by the DCI format would be scheduled, and if the DCI format indicates that the retransmission of the PUSCH would not be scheduled, the UE stops a predefined timer for a HARQ process associated with the uplink transmission (e.g., drx-RetransmissionTimerUL and drx-HARQ-RTT-TimerUL) in a predetermined time. The predetermined time may be a time defined in embodiments of the disclosure, for example, the first symbol after the end of the first transmission of the corresponding PUSCH transmission (e.g., the first transmission within the repetition transmission bundle). If the DCI format does not indicate that the retransmission of the PUSCH is not scheduled, the UE starts the predefined timer for the HARQ process associated with the uplink transmission (e.g., drx-HARQ-RTT-TimerUL) in the predetermined time.

It should be noted that "whether a retransmission of a PDSCH scheduled by the DCI format would be scheduled" may also be replaced by "whether to stop (or start) a predefined timer (e.g., drx-RetransmissionTimerDL and/or drx-HARQ-RTT-TimerDL) after the HARQ-ACK feedback"; and "whether a retransmission of a PUSCH scheduled by the DCI format would be scheduled" may also be replaced by "whether to stop (or start) a predefined timer (e.g., drx-RetransmissionTimerUL and/or drx-HARQ-RTT-TimerUL) in the first symbol after the end of the first transmission of the PUSCH transmission (e.g., the first transmission within the repetition transmission bundle)".

The method can reduce the time for the UE to blindly detect the PDCCH, and thus reduce the power consumption of the UE.

Manner MN2

In some implementations, a parameter may be configured in an SPS PDSCH configuration parameter (e.g., the 3GPP parameter SPS-Config) to indicate whether a retransmission is supported (alternatively, whether to stop (or start) a predefined timer (e.g., drx-RetransmissionTimerDL and/or drx-HARQ-RTT-TimerDL) in a predefined time (for example, the first symbol after the end of the corresponding transmission transmitting/carrying the DL HARQ feedback corresponding to the SPS PDSCH)); if this parameter indicates that the retransmission is not supported (alternatively, indicates to stop the predefined timer after the HARQ-ACK feedback), the UE stops the predefined timer (e.g., drx-RetransmissionTimerDL and drx-HARQ-RTT-TimerDL) in the predefined time (for example, the first symbol after the end of the corresponding transmission transmitting/carrying the DL HARQ feedback corresponding to the SPS PDSCH), otherwise, the UE starts the predefined timer (e.g., drx-HARQ-RTT-TimerDL) in the predefined time.

In some implementations, a parameter may be configured in a CG PUSCH configuration parameter (e.g., the 3GPP parameter ConfiguredGrantConfig) to indicate whether a retransmission is supported (alternatively, whether to stop (or start) a predefined timer (e.g., drx-RetransmissionTimerUL and drx-HARQ-RTT-TimerUL) in a predefined time (for example, the first symbol after the end of the first transmission of the PUSCH transmission (e.g., the first transmission within the repetition transmission bundle)); if this parameter indicates that the retransmission is not supported (alternatively, indicates to stop the predefined timer (e.g., drx-RetransmissionTimerUL and drx-HARQ-RTT-TimerUL in the first symbol after the end of the first transmission of a CG PUSCH transmission (e.g., the first transmission within the repetition transmission bundle)), the UE stops the predefined timer in the first symbol after the end of the first transmission of the CG PUSCH transmission (e.g., the first transmission within the repetition transmission bundle), otherwise, the UE starts the predefined timer (e.g., drx-HARQ-RTT-TimerUL) in the first symbol after the end of the first transmission of the CG PUSCH transmission (e.g., the first transmission within the repetition transmission bundle).

The method can reduce the time for the UE to blindly detect the PDCCH, and thus reduce the power consumption of the UE.

Manner MN3

In some implementations, a parameter may be configured in the SPS PDSCH configuration parameter to indicate a number N (N may indicate a total number of transmissions, or N may indicate a number of transmissions scheduled by a DCI format) of transmissions. N may be a non-negative integer or a positive integer. The UE stops a predefined timer (e.g., drx-RetransmissionTimerDL and drx-HARQ-RTT-TimerDL) in the first symbol after the end of the corresponding transmission carrying the DL HARQ feedback corresponding to the N-th transmission (retransmission) of the SPS PDSCH. The UE starts the predefined timer (e.g., drx-HARQ-RTT-TimerDL) in the first symbol after the end of the corresponding transmission carrying the DL HARQ feedback corresponding to a retransmission of the SPS PDSCH which is not the N-th retransmission.

In some implementations, a parameter may be configured in the CG PUSCH configuration parameter (e.g., the 3GPP parameter ConfiguredGrantConfig) to indicate a number M (M may indicate a total number of transmissions, or M may indicate a number of transmissions scheduled by a DCI format) of transmissions. M may be a non-negative integer or a positive integer. The UE stops a predefined timer (e.g., drx-RetransmissionTimerUL and drx-HARQ-RTT-TimerUL) in a predefined time (e.g., the first symbol after the end of the first transmission of the M-th transmission (or retransmission) of the CG PUSCH (e.g., the first transmission within the repetition transmission bundle)). The UE starts the predefined timer (e.g., drx-HARQ-RTT-TimerUL) in the first symbol after the end of the first transmission of a transmission (or repetition) of the CG PUSCH which is not the M-th transmission (or repetition) (e.g., the first transmission within the repetition transmission bundle).

It should be noted that, if N is equal to 0 or M is equal to 0, it means that the retransmission is not scheduled, and it may be processed according to Manner MN2.

The method can reduce the time for the UE to blindly detect the PDCCH, and thus reduce the power consumption of the UE.

Figure 8:
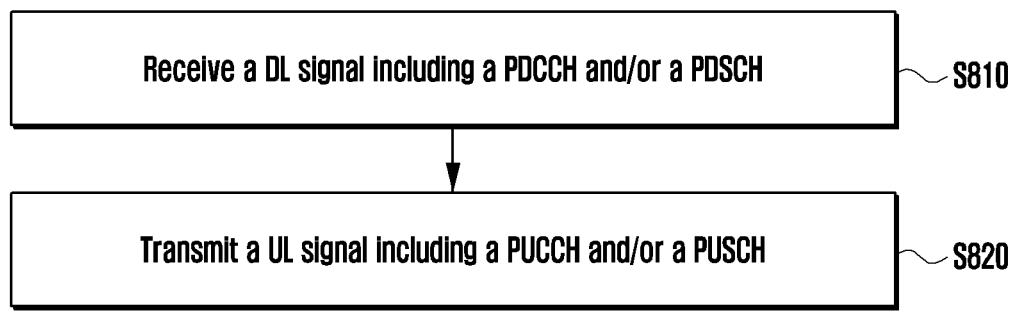
FIG. 8 illustrates a flowchart of a method performed by a UE according to some embodiments of the present disclosure.

FIG. 8 illustrates a flowchart of a method 800 performed by a UE according to an embodiment of the present disclosure.

Referring to FIG. 8, in operation S810, a DL signal including a PDCCH and/or a PDSCH is received.

In operation S820, a UL signal including a PUCCH and/or a PUSCH is transmitted.

In embodiments, the UE monitors the PDCCH when the UE is in an active time of a DRX mode.

In some implementations, for a HARQ process of the DL signal, at least one of the following may be performed in a first predetermined time in case that a UL transmission carrying a DL HARQ feedback is cancelled and/or delayed: starting a first predetermined timer for the HARQ process, where the UE is in the active time of the DRX mode for PDCCH monitoring when the first predetermined timer is running; starting a DL retransmission timer for the HARQ process; or starting the DL retransmission timer for the HARQ process if data of the HARQ process is not successfully decoded.

In some implementations, in case that undetected DCI is determined to be present, at least one of the following may be performed in a second predetermined time: starting a second predetermined timer, where the UE is in the active time of the DRX mode for PDCCH monitoring when the second predetermined timer is running; starting or restarting an inactivity timer; starting or restarting a DL round-trip time (RTT) timer for a predetermined HARQ process; or starting or restarting a DL retransmission timer for the predetermined HARQ process.

In some implementations, after successfully receiving a random access response for a contention-based random access preamble not selected by a Medium Access Control (MAC) entity, the UE may be determined to be in the active time based on at least one of that: (i) the UE does not receive a PDCCH that indicates a new transmission and is scrambled by a cell radio network temporary identifier (C-RNTI) and the UE does not receive a PDCCH scrambled by a configured scheduling radio network temporary identifier (CS-RNTI); or (ii) a third predetermined timer is running, where the UE is in the active time of the DRX mode for PDCCH monitoring when the third predetermined timer is running.

In some implementations, in case that the received PDCCH activates an SPS PDSCH and/or a Type-2 configured grant PUSCH, a fourth predetermined timer may be started in a third predetermined time, where the UE is in the active time of the DRX mode for PDCCH monitoring when the fourth predetermined timer is running.

In some implementations, in case that the UE receives the DL signal or transmits the UL signal, the UE may start a fifth predetermined timer in a fourth predetermined time. The UE stops at least one of an inactivity timer, a DL retransmission timer, a UL retransmission timer, a DL RTT timer, or a UL RTT timer for each of all HARQ processes associated with the downlink signal, in case that the fifth predetermined timer expires.

In some implementations, in case that uplink transmission of the uplink signal includes only the DL HARQ feedback, at least one of the UL retransmission timer or the UL RTT timer for the HARQ process associated with the uplink transmission may be stopped in a fifth predetermined time.

In some implementations, each of the first predetermined time, the second predetermined time, the third predetermined time, the fourth predetermined time and the fifth predetermined time is based on at least one of:

the first time unit after the end of a UL transmission carrying a DL HARQ feedback;

the start of a time unit after the end of the UL transmission carrying the DL HARQ feedback;

the first time unit after the end of reception of the PDCCH;

the first time unit after a DL round-trip time (RTT) timer expires;

the first time unit after a UL RTT timer expires;

the first time unit after the end of the first repetition or the last repetition of the UL transmission carrying the DL HARQ feedback in case that the UL transmission includes repetitions;

the first time unit after the UE successfully receives a random access response for a contention-based random access preamble not selected by the MAC entity; or a start of a time unit after the UE successfully receives the random access response for the contention-based random access preamble not selected by the MAC entity.

For example, the time unit may be one of a subframe, a slot, a subslot, or a symbol.

In some implementations, each of the first predetermined timer, the second predetermined timer, the third predetermined timer, the fourth predetermined timer or the fifth predetermined timer may include at least one of: a DL retransmission timer, a UL retransmission timer, an inactivity timer, a DL RTT timer, a UL RTT timer, an ON duration timer, or a newly defined timer.

For example, the DL retransmission timer may include drx-RetransmissionTimerDL.

For example, the UL retransmission timer may include drx-RetransmissionTimerUL.

For example, the inactivity timer may include drx-InactivityTimer.

For example, the DL RTT timer may include drx-HARQ-RTT-TimerDL.

For example, the UL RTT timer may include drx-HARQ-RTT-TimerUL.

For example, the ON duration timer may include drx-onDurationTimer.

Figure 9:
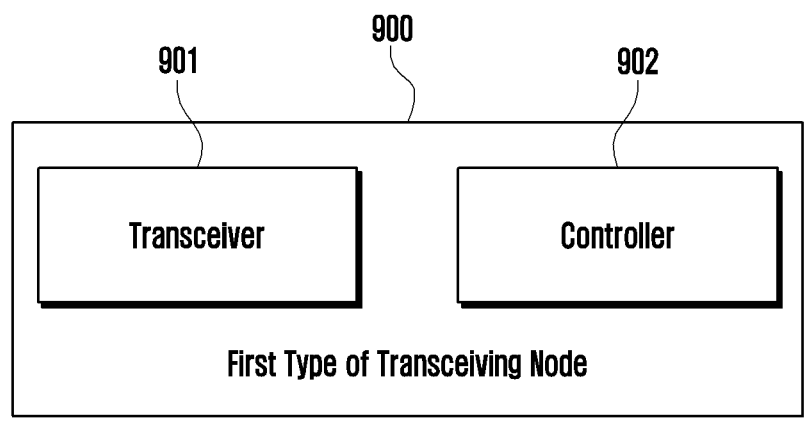
FIG. 9 illustrates a block diagram of a first type of transceiving node according to some embodiments of the present disclosure.

FIG. 9 illustrates a block diagram of a first type of transceiving node 900 according to some embodiments of the present disclosure.

Referring to FIG. 9, the first type of transceiving node 900 may include a transceiver 901 and a controller 902.

The transceiver 901 may be configured to transmit first type of data and/or first type of control signaling to a second type of transceiving node and receive second type of data and/or second type of control signaling from the second type of transceiving node in a time unit.

The controller 902 may be an application specific integrated circuit or at least one processor. The controller 902 may be configured to control the overall operation of the first type of transceiving node, including controlling the transceiver 901 to transmit the first type of data and/or the first type of control signaling to the second type of transceiving node and receive the second type of data and/or the second type of control signaling from the second type of transceiving node in a time unit.

In some implementations, the controller 902 may be configured to perform one or more of operations in the methods of various embodiments described above.

In the following description, a base station is taken as an example (but not limited thereto) to illustrate the first type of transceiving node, a UE is taken as an example (but not limited thereto) to illustrate the second type of transceiving node. Downlink data and/or downlink control signaling (but not limited thereto) are used to illustrate the first type of data and/or the first type of control signaling. A HARQ-ACK codebook may be included in the second type of control signaling, and uplink control signaling (but not limited thereto) is used to illustrate the second type of control signaling.

Figure 10:
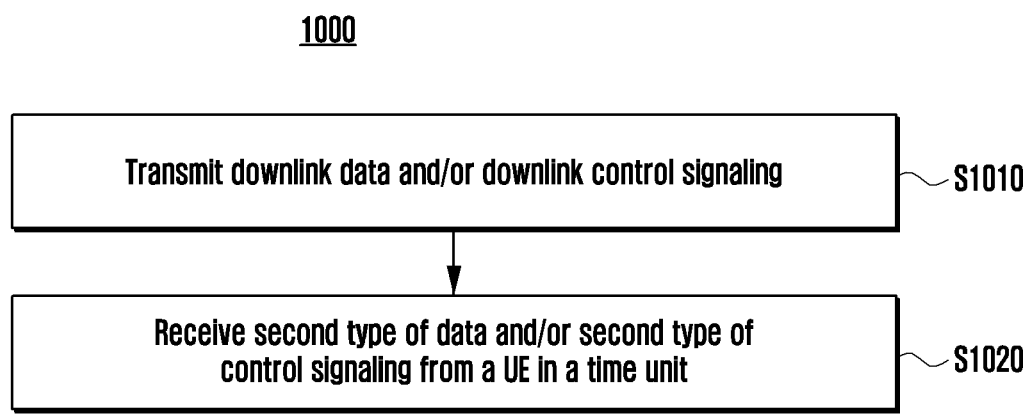
FIG. 10 illustrates a flowchart of a method performed by a base station according to some embodiments of the present disclosure.

FIG. 10 illustrates a flowchart of a method 1000 performed by a base station according to some embodiments of the present disclosure.

Referring to FIG. 10, in step S1010, the base station transmits downlink data and/or downlink control information.

In step S1020, the base station receives second type of data and/or second type of control information from a UE in a time unit.

For example, the method 1000 may include one or more of the operations performed by the base station described in various embodiments of the disclosure.

In some implementations, the downlink channel may include a PDCCH and/or a PDSCH. The uplink channel may include a PUCCH and/or a PUSCH.

In some implementations, the base station may transmit configuration information to the second type of transceiving node. For example, the configuration information may include parameters of one or more of the various timers described above. For example, the configuration information may be transmitted via higher layer signaling (e.g., RRC signaling or a MAC CE).

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the disclosure of the disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

The various illustrative logic blocks, modules, and circuits described in this application may be implemented or performed by a general purpose processor, a Digital Signal Processor (DSP), an Application Specific Integrated Circuit (ASIC), a Field Programmable Gate Array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination thereof. The software module may reside in RAM memory, flash memory, ROM memory, EPROM memory, EEPROM memory, register, hard disk, removable disk, or any other form of storage medium known in the art. An exemplary storage medium is coupled to a processor to enable the processor to read and write information from/to the storage media. In an alternative, the storage medium may be integrated into the processor. The processor and the storage medium may reside in an ASIC. The ASIC may reside in a user terminal. In an alternative, the processor and the storage medium may reside in the user terminal as discrete components.

In one or more exemplary designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
monitoring a physical downlink control channel (PDCCH) based on the UE being in an active time of a discontinuous reception (DRX) mode;
in case that downlink control information (DCI) on the PDCCH is not detected, starting a downlink (DL)

round-trip time (RTT) timer for a predetermined hybrid automatic repeat request (HARQ) process, in a first predetermined time;

receiving, from a base station, the DCI while the DL RTT timer is running;

receiving, from the base station, a physical downlink shared channel (PDSCH) scheduled by the DCI;

generating HARQ-acknowledgement (HARQ-ACK) information corresponding to the PDSCH; and transmitting the HARQ-ACK information on a physical uplink control channel (PUCCH) or a physical uplink shared channel (PUSCH).

2. The method of claim 1, further comprising:
identifying that an uplink (UL) transmission of the HARQ-ACK information is delayed; and
based on the identification, starting a downlink (DL) retransmission timer for a HARQ process corresponding to the PDSCH.

3. The method of claim 1, further comprising:
starting a fourth predetermined timer in a third predetermined time, in case that the UE receives the PDCCH activating a semi persistent scheduling (SPS) PDSCH or an uplink (UL) Type-2 configured grant PUSCH,
wherein the UE is in the active time of the DRX mode for PDCCH monitoring when the fourth predetermined timer is running.

4. The method of claim 1, further comprising:
starting a fifth predetermined timer in a fourth predetermined time, in case that the UE receives the PDSCH for a service; and
stopping at least one of an inactivity timer, a DL retransmission timer, an uplink (UL) retransmission timer, a DL RTT timer, or a UL RTT timer for all HARQ processes associated with the service, in case that the fifth predetermined timer expires.

5. The method of claim 1, wherein the UE stops at least one of an uplink (UL) retransmission timer or a UL RTT timer for a HARQ process associated with a transmission of the PUSCH in a fifth predetermined time, in case that the PUSCH includes only the HARQ-ACK information.

6. The method of claim 1, wherein each of a first predetermined time, a third predetermined time, a fourth predetermined time and a fifth predetermined time is based on at least one of:
a first time unit after an end of an uplink (UL) transmission carrying the HARQ-ACK information;
a start of a time unit after the end of the UL transmission carrying the HARQ-ACK information;
a first time unit after an end of a reception of the PDCCH;
a first time unit after a DL RTT timer expires;
a first time unit after a UL RTT timer expires; or
a first time unit after an end of a first repetition or a last repetition of the UL transmission carrying the HARQ-ACK information, in case that the UL transmission includes repetitions.

7. The method of claim 6, wherein each of a fourth predetermined timer or a fifth predetermined timer includes at least one of: a DL retransmission timer, a UL retransmission timer, an inactivity timer, a DL RTT timer, a UL RTT timer, an ON duration timer, or a newly defined timer.

8. The method of claim 1, wherein whether to detect DCI on the PDCCH is identified based on a downlink assignment indication (DAI).

9. The method of claim 1, wherein the predetermined HARQ process includes at least one of (i) a HARQ process without a feedback of a HARQ-ACK or (iii) a HARQ process corresponding to a DL RTT timer that expires.

10. A user equipment (UE) in a wireless communication system, the UE comprising:
a transceiver configured to transmit and receive signals; and
a controller coupled to the transceiver and configured to:
monitor a physical downlink control channel (PDCCH) based on the UE being in an active time of a discontinuous reception (DRX) mode,
in case that downlink control information (DCI) on the PDCCH is not detected, start a downlink (DL) round-trip time (RTT) timer for a predetermined hybrid automatic repeat request (HARQ) process, in a first predetermined time,
receive, from a base station, the DCI while the DL RTT timer is running,
receive, from the base station, a physical downlink shared channel (PDSCH) scheduled by the DCI,
generate HARQ-acknowledgement (HARQ-ACK) information corresponding to the PDSCH, and
transmit the HARQ-ACK information on a physical uplink control channel (PUCCH) or a physical uplink shared channel (PUSCH).

11. The UE of claim 10, wherein the controller is further configured to:
identify that an uplink (UL) transmission of the HARQ-ACK information is delayed, and
based on the identification, start a downlink (DL) retransmission timer for a HARQ process corresponding to the PDSCH.

12. The UE of claim 10, wherein the controller is further configured to start a fourth predetermined timer in a third predetermined time, in case that the UE receives the PDCCH activating a semi persistent scheduling (SPS) PDSCH or an uplink (UL) Type-2 configured grant PUSCH, and wherein the UE is in the active time of the DRX mode for PDCCH monitoring when the fourth predetermined timer is running.

13. The UE of claim 10, wherein the controller is further configured to:
start a fifth predetermined timer in a fourth predetermined time, in case that the UE receives the PDSCH for a service, and
stop at least one of an inactivity timer, a DL retransmission timer, an uplink (UL) retransmission timer, a DL RTT timer, or a UL RTT timer for all HARQ processes associated with the service, in case that the fifth predetermined timer expires.

14. The UE of claim 10, wherein the controller is configured to stop at least one of an uplink (UL) retransmission timer or a UL round-trip time (RTT) timer for a HARQ process associated with a transmission of the PUSCH in a fifth predetermined time, in case that the PUSCH includes only the HARQ-ACK information.

15. The UE of claim 10, wherein each of a first predetermined time, a third predetermined time, a fourth predetermined time and a fifth predetermined time is based on at least one of:
a first time unit after an end of an uplink (UL) transmission carrying the HARQ-ACK information;
a start of a time unit after the end of the UL transmission carrying the HARQ-ACK information;
a first time unit after an end of a reception of the PDCCH;
a first time unit after a DL RTT timer expires;
a first time unit after a UL RTT timer expires; or
a first time unit after an end of a first repetition or a last repetition in the UL transmission carrying the HARQ-ACK information, in case that the UL transmission includes repetitions.

16. The UE of claim 15, wherein each of a fourth predetermined timer or a fifth predetermined timer includes at least one of: a DL retransmission timer, a UL retransmission timer, an inactivity timer, a DL RTT timer, a UL RTT timer, an ON duration timer, or a newly defined timer.

* * * * *